United States Patent
Kim et al.

(10) Patent No.: US 10,141,983 B2
(45) Date of Patent: Nov. 27, 2018

(54) METHOD FOR ACTIVATING PSCELL AND SCELL IN MOBILE COMMUNICATION SYSTEM SUPPORTING DUAL CONNECTIVITY

(71) Applicant: Samsung Electronics Co., Ltd., Suwon-si, Gyeonggi-do (KR)

(72) Inventors: Soenghun Kim, Suwon-si (KR); Gert-Jan Van Lieshout, Apeldoorn (NL); Sangbum Kim, Suwon-si (KR); Jaehyuk Jang, Suwon-si (KR); Kyeongin Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 14/706,455

(22) Filed: May 7, 2015

(65) Prior Publication Data
US 2015/0327107 A1 Nov. 12, 2015

(30) Foreign Application Priority Data

May 8, 2014 (KR) .................. 10-2014-0055111
Nov. 18, 2014 (KR) .................. 10-2014-0160996

(51) Int. Cl.
*H04B 7/024* (2017.01)
*H04W 72/04* (2009.01)
(Continued)

(52) U.S. Cl.
CPC ........... *H04B 7/024* (2013.01); *H04L 5/0098* (2013.01); *H04W 72/0406* (2013.01);
(Continued)

(58) Field of Classification Search
None
See application file for complete search history.

(56) References Cited

U.S. PATENT DOCUMENTS 7,372,835 B2 5/2008 Lee et al.
9,237,537 B2 * 1/2016 Dinan ............... H04W 56/0005
(Continued)

FOREIGN PATENT DOCUMENTS

WO   WO 2014163550 A1 * 10/2014 ............ H04W 36/04

OTHER PUBLICATIONS

3GPP TS 36.321 V12.1.0, '3GPP; TSG RAN; E-UTRA; MAC protocol specification (Release 12)', Mar. 20, 2014.
(Continued)

*Primary Examiner* — Andrew C Oh
(74) *Attorney, Agent, or Firm* — Jefferson IP Law, LLP

(57) ABSTRACT

The present disclosure relates to communication methods and systems for converging a 5th-Generation (5G) communication system for supporting higher data rates beyond a 4th-Generation (4G) system utilizing technology for Internet of Things (IoT). The present disclosure is applicable to intelligent services utilizing 5G communication technology and IoT-related technology, such as smart home, smart building, smart city, smart car, connected car, health care, digital education, smart retail, security and safety services. A Secondary Cell (SCell) method and apparatus for activating an SCell are provided for use in a mobile communication system supporting dual connectivity. The method includes receiving a control message instructing activation of at least one SCell, determining whether the SCell is a primary SCell (pSCell) based on the control message, monitoring, when the SCell is the pSCell, a Physical Downlink Control Channel (PDCCH) of the pSCell, and reporting, after starting PDCCH monitoring, Channel Status Information (CSI) for the SCell.

16 Claims, 15 Drawing Sheets

(51) Int. Cl.
*H04W 76/20* (2018.01)
*H04L 5/00* (2006.01)
*H04W 88/06* (2009.01)
*H04W 88/10* (2009.01)

(52) U.S. Cl.
CPC ............. *H04W 76/20* (2018.02); *H04L 5/001* (2013.01); *H04L 5/0053* (2013.01); *H04W 88/06* (2013.01); *H04W 88/10* (2013.01)

(56) References Cited

U.S. PATENT DOCUMENTS

| | | | | |
|---|---|---|---|---|
| 9,485,765 | B2* | 11/2016 | Kim | H04W 52/0216 |
| 2012/0099515 | A1* | 4/2012 | Chen | H04W 74/006 |
| | | | | 370/315 |
| 2012/0176967 | A1* | 7/2012 | Kim | H04W 76/36 |
| | | | | 370/328 |
| 2012/0257513 | A1* | 10/2012 | Yamada | H04L 1/0618 |
| | | | | 370/248 |
| 2013/0188473 | A1* | 7/2013 | Dinan | H04W 56/0005 |
| | | | | 370/216 |
| 2013/0272235 | A1* | 10/2013 | Tseng | H04W 56/0005 |
| | | | | 370/329 |
| 2014/0056243 | A1* | 2/2014 | Pelletier | H04W 74/04 |
| | | | | 370/329 |
| 2014/0241317 | A1* | 8/2014 | Jamadagni | H04L 5/0032 |
| | | | | 370/331 |
| 2014/0295860 | A1* | 10/2014 | Kuo | H04W 24/02 |
| | | | | 455/450 |
| 2014/0335882 | A1* | 11/2014 | Lee | H04W 76/15 |
| | | | | 455/452.2 |
| 2015/0003373 | A1* | 1/2015 | Zhao | H04L 27/2605 |
| | | | | 370/329 |
| 2015/0016419 | A1* | 1/2015 | Kim | H04W 36/04 |
| | | | | 370/331 |
| 2015/0043492 | A1* | 2/2015 | Baek | H04W 76/15 |
| | | | | 370/329 |
| 2015/0109986 | A1* | 4/2015 | Siomina | H04L 1/1854 |
| | | | | 370/312 |
| 2015/0117374 | A1* | 4/2015 | Wu | H04W 74/0833 |
| | | | | 370/329 |
| 2015/0264666 | A1* | 9/2015 | Yi | H04L 5/001 |
| | | | | 370/329 |
| 2015/0271806 | A1* | 9/2015 | Kim | H04L 5/0007 |
| | | | | 455/452.1 |
| 2015/0312798 | A1* | 10/2015 | Rune | H04W 74/006 |
| | | | | 370/236 |
| 2015/0312947 | A1* | 10/2015 | Park | H04L 5/0098 |
| | | | | 370/329 |
| 2015/0350882 | A1* | 12/2015 | Uchino | H04W 8/24 |
| | | | | 370/329 |
| 2016/0029245 | A1* | 1/2016 | Hong | H04W 28/0278 |
| | | | | 370/329 |
| 2016/0057660 | A1* | 2/2016 | Hong | H04W 36/0016 |
| | | | | 455/436 |
| 2016/0066237 | A1* | 3/2016 | Kato | H04L 1/16 |
| | | | | 370/331 |
| 2016/0128003 | A1* | 5/2016 | Callender | H04W 52/365 |
| | | | | 370/311 |
| 2016/0150502 | A1* | 5/2016 | Sebire | H04W 72/04 |
| | | | | 455/450 |
| 2016/0205539 | A1* | 7/2016 | Liu | H04W 8/22 |
| | | | | 455/418 |
| 2016/0205681 | A1* | 7/2016 | Kim | H04B 7/2656 |
| | | | | 370/329 |
| 2016/0212775 | A1* | 7/2016 | Xu | H04W 76/10 |
| 2016/0234714 | A1* | 8/2016 | Basu Mallick | H04W 28/085 |
| 2016/0249259 | A1* | 8/2016 | Park | H04W 36/00 |
| 2016/0255665 | A1* | 9/2016 | Futaki | H04W 52/36 |
| | | | | 370/329 |
| 2016/0255675 | A1* | 9/2016 | Van Lieshout | H04L 1/1829 |
| | | | | 370/329 |
| 2016/0270139 | A1* | 9/2016 | Rahman | H04W 56/00 |
| 2016/0285716 | A1* | 9/2016 | Pelletier | H04L 5/0098 |
| 2016/0295613 | A1* | 10/2016 | Wager | H04L 41/0813 |
| 2017/0041940 | A1* | 2/2017 | Falconetti | H04L 5/006 |
| 2017/0105128 | A1* | 4/2017 | Chiba | H04W 24/02 |

OTHER PUBLICATIONS

Samsung, 'Activation and deactivation for dual connectivity', R2-141487, 3GPP TSG RAN WG2 #85b, Mar. 21, 2014.
Nsn et al., 'SCG Cell scheduling and activation', R2-141181, 3GPP TSG RAN WG2 Meeting #85bis, Mar. 21, 2014.
Interdigital Communications, 'Definition of the Special Cell for SCG with Dual Connectivity', R2-141353, 3GPP TSG Ran WG2 #85bis, Mar. 21, 2014.
ZTE: "Discussion on RACH issue on SeNB", 3GPP DRAFT; R2-141119 Discussion on RACH Issue on SENB, 3rd Generation Partnership Project (3GPP), Mobile Competence Centre; 650, Route Des Lucioles; F-06921 Sophia-Antipolis Cedex; France, vol. RAN WG2, no. Valencia, Spain, Mar. 22, 2014, XP050792377.

* cited by examiner

METHOD FOR ACTIVATING PSCELL AND SCELL IN MOBILE COMMUNICATION SYSTEM SUPPORTING DUAL CONNECTIVITY

CROSS-REFERENCE TO RELATED APPLICATION(S)

This application claims the benefit under 35 U.S.C. § 119(a) of a Korean patent application filed on May 8, 2014, in the Korean Intellectual Property Office and assigned Serial number 10-2014-0055111, and of a Korean patent application filed on Nov. 18, 2014, in the Korean Intellectual Property Office and assigned Serial number 10-2014-0160996, the entire disclosures of each of which are hereby incorporated by reference.

TECHNICAL FIELD

The present disclosure relates to a method and apparatus for activating a Secondary Cell (SCell) in a mobile communication system supporting dual connectivity.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Mobile communication systems were developed to provide the subscribers with voice communication services while moving about. With the rapid advance of technologies, the mobile communication systems have evolved to support high speed data communication services beyond the early voice-oriented services. However, the limited resource and user requirements for higher speed services in the current mobile communication system spur the evolution to more advanced mobile communication systems.

Meanwhile, dual connectivity is an operation where a given User Equipment (UE) consumes radio resources provided by at least two different network points connected with non-ideal backhaul. For example, a UE may connect to a macro evolved Node B (eNB) and a small (pico) eNB that are playing different roles to receive a service.

The dual connectivity is an issue under discussion in various communication standardization organizations.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for activating a Secondary Cell (SCell) efficiently in a mobile communication system supporting the dual connectivity.

Another aspect of the present disclosure is to provide a method and apparatus for the primary SCell (pSCell) and SCells for efficient communication in a mobile communication system supporting the dual connectivity.

In accordance with an aspect of the present disclosure, an SCell activation method of a terminal supporting dual connectivity is provided. The SCell activation method includes receiving a control message instructing activation of at least one SCell, determining whether the SCell is a pSCell based on the control message, monitoring, when the SCell is the pSCell, a Physical Downlink Control Channel (PDCCH) of the pSCell, and reporting, after starting PDCCH monitoring, Channel Status Information (CSI) for the SCell.

In accordance with another aspect of the present disclosure, an SCell activation apparatus of a terminal supporting dual connectivity is provided. The SCell activation apparatus includes a transceiver configured to communicate with at least one network node and a controller which controls the transceiver to receive a control message instructing activation of at least one SCell, to determine whether the SCell is a pSCell based on the control message, to monitor, when the SCell is the pSCell, a PDCCH of the pSCell, and to report, after starting PDCCH monitoring, CSI for the SCell.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numbers are used to represent the same elements throughout the drawings.

DETAILED DESCRIPTION

Figure 1:
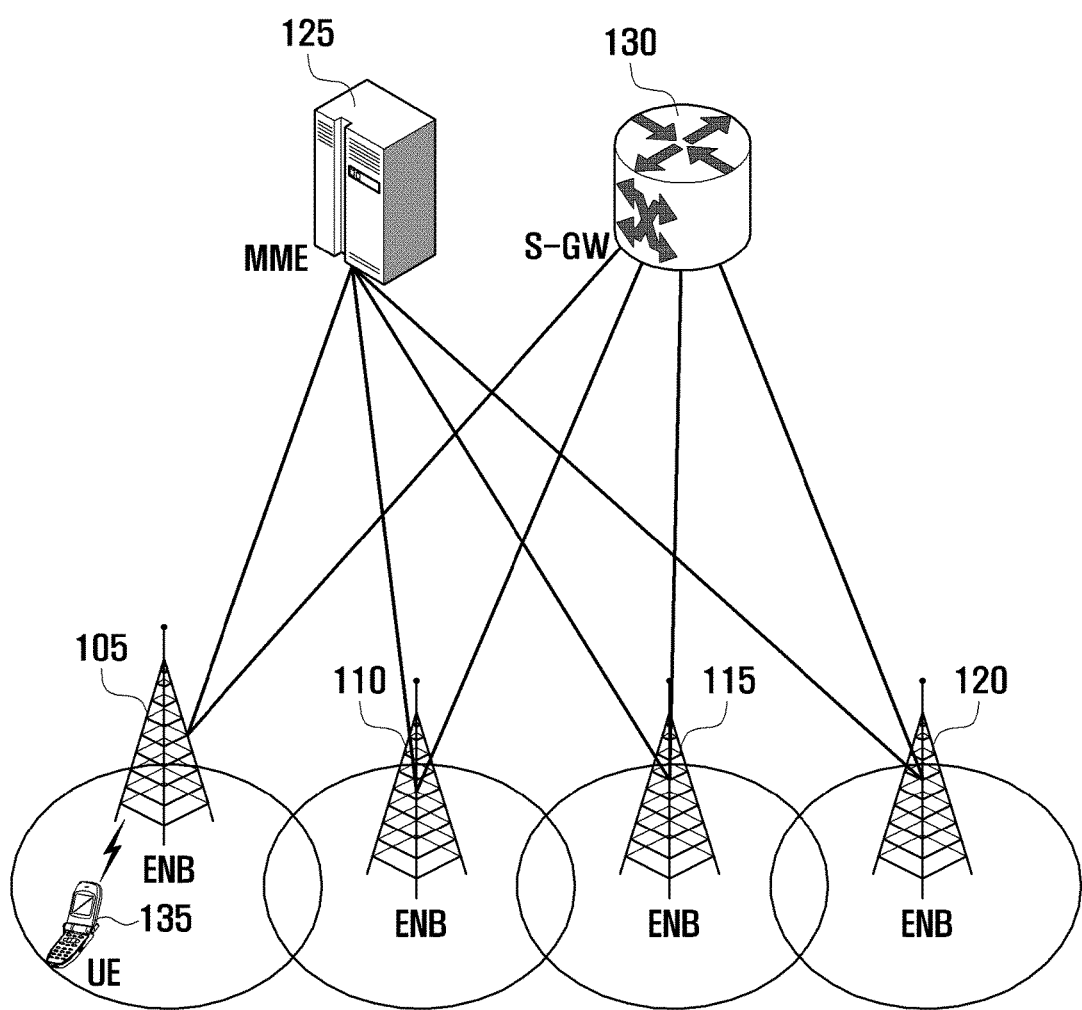
FIG. 1 is a diagram illustrating the architecture of a Long Term Evolution (LTE) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, terms such as "first," "second," etc. are used to describe various components. However, it is obvious that the components should not be defined by these terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing particular embodiments only and is not intended to be limiting of the present disclosure. It will be further understood that the terms "comprises", "comprising", "includes" and/or "including", when used herein, specify the presence of stated features, integers, operations, elements, and/or components, but do not preclude the presence or addition of one or more other features, operations, elements, components, and/or groups thereof.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The present disclosure provides a signal transmission/reception method and apparatus for use in a mobile communication system supporting multiple carriers.

Also, the present disclosure provides a signal transmission/reception method and apparatus for use in the mobile communication system supporting inter-evolved Node B (eNB) Carrier Aggregation (CA).

The signal transmission/reception apparatus and method of the present disclosure is applicable to various types of communication systems such as Long-Term Evolution (LTE) mobile communication system, LTE-Advanced (LTE-A) mobile communication system, High-Speed Downlink Packet Access (HSDPA) mobile communication system, High-Speed Uplink Packet Access (HSUPA) mobile communication system, 3rd Generation Partnership Project 2 (3GPP2) High Rate Packet Data (HRPD) mobile communication system, 3GPP2 Wideband Code Division Multiple Access (WCDMA) mobile communication system, 3GPP2 CDMA mobile communication system, Institute of Electrical and Electronics Engineers (IEEE) 802.16m communication system, Evolved Packet System (EPS), and Mobile Internet Protocol (Mobile IP) system.

First, an LTE system according to an embodiment of the present disclosure is described with reference to FIG. 1.

FIG. 1 is a diagram illustrating the architecture of an LTE system according to an embodiment of the present disclosure.

Referring to FIG. 1, the radio access network of the LTE system includes eNBs 105, 110, 115, and 120, a Mobility Management Entity (MME) 125, and a Serving-Gateway (S-GW) 130. The User Equipment (UE) 135 connects to an external network via the eNBs 105, 110, 115, and 120, and the S-GW 130.

In FIG. 1, the eNBs 105, 110, 115, and 120 correspond to the legacy node Bs of the Universal Mobile Telecommunications System (UMTS) system. The eNBs 105, 110, 115, and 120 allow the UE 135 to establish a radio channel and are responsible for functions more complicated as compared to the legacy node B.

In the LTE system, all the user traffic services including real time services such as Voice over IP (VoIP) are provided through a shared channel and thus there is a need of a device to schedule data based on the state information (such as buffer status, power headroom status, and channel condition of the UE), the eNBs 105, 110, 115, and 120 being responsible for such functions. Typically, one eNB controls a plurality of cells. In order to secure a data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE.

The S-GW 130 is an entity to provide data bearers, e.g., it establishes and releases data bearers under the control of the MME 125. The MME 125 is responsible for mobility management of UEs and various control functions and may be connected to a plurality of eNBs. A description is made of the protocol stacks of the LTE system according to an embodiment of the present disclosure with reference to FIG. 2.

Figure 2:
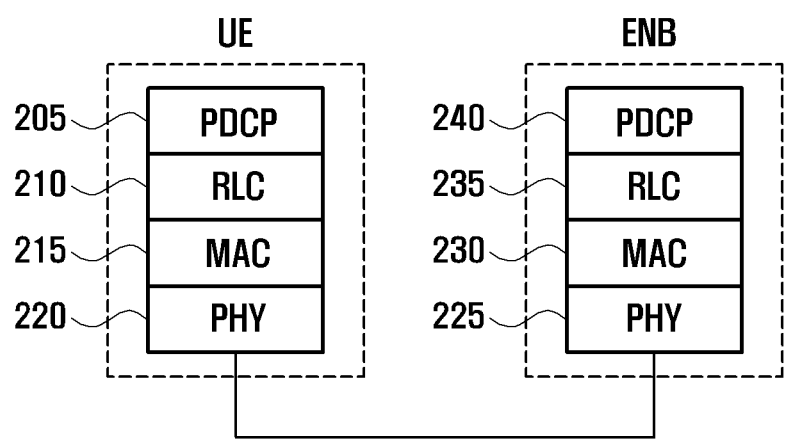
FIG. 2 is a diagram illustrating a protocol stack of the LTE system according to an embodiment of the present disclosure.

FIG. 2 is a diagram illustrating a protocol stack of the LTE system according to an embodiment of the present disclosure.

Referring to FIG. 2, the protocol stack of the LTE system includes Packet Data Convergence Protocol (PDCP) layer 205 and 240, Radio Link Control (RLC) layer 210 and 235, Media Access Control (MAC) layer 215 and 230, and Physical (PHY) layer 220 and 225.

The PDCPs 205 and 240 are responsible for IP header compression/decompression, and the RLCs 210 and 235 are responsible for segmenting the PDCP Protocol Data Unit (PDU) into segments in appropriate size for Automatic Repeat reQuest (ARQ) operation.

The MACs 215 and 230 are responsible for establishing connection to a plurality of RLC entities so as to multiplex the RLC PDUs into MAC PDUs and demultiplex the MAC PDUs into RLC PDUs. The PHYs 220 and 225 perform channel coding on the MAC PDU and modulate the MAC PDU into OFDM symbols to transmit over radio channel or perform demodulating and channel-decoding on the received OFDM symbols and deliver the decoded data to the higher layer.

A description is made of inter-eNB CA adopted to the LTE system according to an embodiment of the present disclosure hereinafter with reference to FIG. 3.

Figure 3:
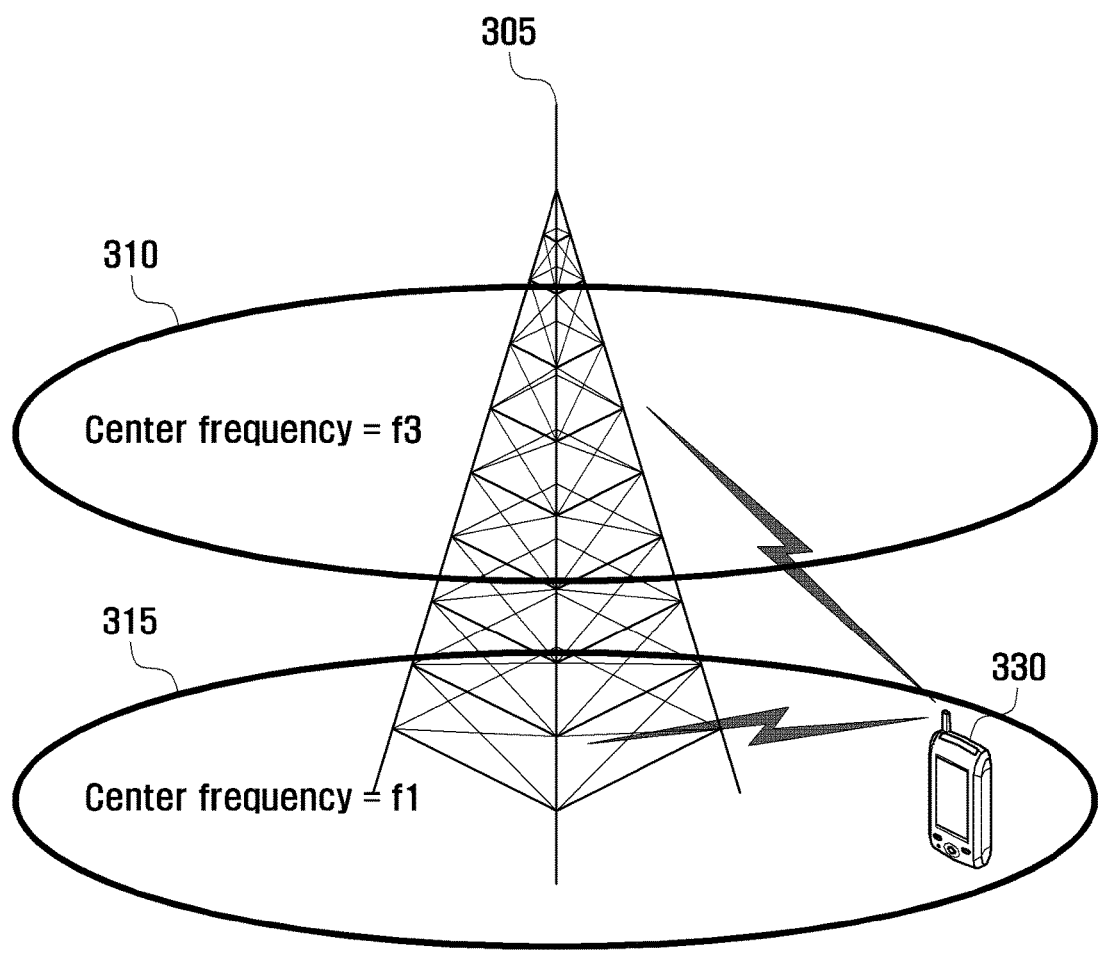
FIG. 3 is a diagram illustrating the concept of the intra-evolved Node B (eNB) carrier aggregation adopted to the LTE system according to an embodiment of the present disclosure.

FIG. 3 is a diagram illustrating the concept of the intra-eNB CA adapted to the LTE system according to an embodiment of the present disclosure.

Referring to FIG. 3, an eNB 305 transmits and receives signals through multiple carriers across a plurality of frequency bands. For example, the eNB 305 can be configured to use the carrier 315 with the center frequency of f1 and the carrier 310 with the center frequency of f3.

If CA is not supported, the UE 330 must transmit/receive data using only one of the carriers 310 and 315. However, the UE 330 having the CA capability can transmit/receive data using both the carriers 310 and 315 concurrently. The eNB can increase the amount of the resources to be allocated to the UE having the CA capability in adaptation to the channel condition of the UE so as to improve the data rate of the UE 330. In the case of aggregating the downlink carriers or the uplink carriers of the eNB, this is referred to as intra-CA. In any case, however, there is a need of aggregating downlink carries or uplink carriers of the different eNBs.

A description is made of the inter-eNB CA adapted to the LTE system according to an embodiment of the present disclosure hereinafter with reference to FIG. 4.

Figure 4:
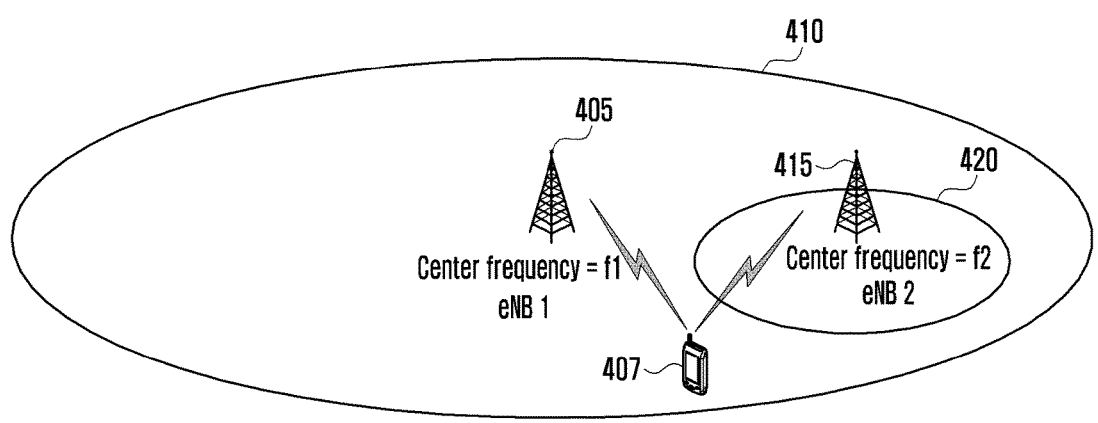
FIG. 4 is a diagram illustrating the concept of the inter-eNB carrier aggregation adopted to the LTE system according to an embodiment of the present disclosure.

FIG. 4 is a diagram illustrating the concept of the inter-eNB CA adopted to the LTE system according to an embodiment of the present disclosure.

Referring to FIG. 4, in the situation that the eNB 1 405 uses a carrier with the center frequency of f1 for signal transmission/reception while the eNB 2 415 uses a carrier with the center frequency of f2, if the carrier with the center frequency of f1 for signal transmission/reception and the carrier with the center frequency of f2 are aggregated for the UE, this means that the UE uses the carriers of both the eNB 1 405 and eNB 2 415 concurrently for signal transmission/reception. In the present disclosure, this kind of CA is referred to as inter-eNB CA. In the following description, the term 'Dual Connectivity (DC)' is used interchangeably with the term 'inter-eNB CA.'

For example, if DC is configured, this means that inter-eNB CA is configured, one or more cell groups are configured, a Secondary Cell Group is configured, at least one Secondary Cell (SCell) under control of an eNB which is not the service eNB is configured, a primary SCell (pSCell) is configured, a MAC entity for the Serving eNB (SeNB) is configured, or two MAC entities are configured at the UE.

The following definitions are provided to facilitate understanding of certain terms used frequently herein.

Assuming that a cell is configured with one downlink carrier and one uplink carrier of an eNB according to the related art, the CA can be understood as if the UE communicates data via multiple cells. At this time, the peak data rate and the number of aggregated carriers have positive correlation.

In the following description, if the UE receives data through a certain downlink carrier or transmits data through a certain uplink carrier, this means that the data are transmitted/received through the control and data channels of the cell corresponding to the center frequency and frequency band defining the carrier. In the following description, CA is expressed in a way that a plurality of serving cells are configured using the terms such as 'primary serving cell (PCell)', 'secondary serving cell (SCell)', and 'activated serving cell'. These terms have the same meanings as used in the LTE mobile communication system. It should be noted that the terms 'carrier', 'component', and 'serving cell' are used interchangeably in the various embodiments of the present disclosure.

In the various embodiments of the present disclosure, a set of the serving cells under control of a same eNB is defined as a Cell Group or Carrier Group (CG). The cell group is categorized into one of a Master Cell Group (MCG) and Secondary Cell Group (SCG).

The MCG is a set of serving cells under the control of the eNB controlling the PCell (hereinafter, referred to as MeNB), and the SCG is a set of the serving cells under control of an eNB which is not the MeNB, i.e., a Slave eNB (SeNB). Whether a certain serving cell belongs to the MCG or SCG is notified to the UE by the eNB in the procedure of configured the corresponding serving cell.

For one UE, one MCG and one or more SCGs can be configured and, although the description here is directed to the case where one SCG is configured for explanation convenience in the various embodiments of the present disclosure, the present disclosure can also be applied equally to the cases where two or more SCGs are configured. The terms 'PCell' and 'SCell' are used to indicate the types of the serving cells configured to the UE. The PCell and SCell are different from each other in some respects, e.g., the PCell always stays in the activated state while the SCell transitions between the activated and deactivated states repeatedly. The UE mobility is controlled in association with the PCell, and the SCell can be understood as a supplementary serving cell for data transmission/reception. In an embodiment of the present disclosure, the PCell and SCell mean the PCell and SCell as defined in the LTE standard TS36.331 and TS36.321.

In the various embodiments of the present disclosure, a situation where the macro and pico cells coexist is assumed. The macro cell is a cell under control of a MeNB and has a relatively large service area. The pico cell is the cell under control of a SeNB and has a small service area in comparison to the macro cell. Although there is no strict criterion to distinguish between the macro and pico cells, it may be assumed that the macro cell has a radius of about 500 meters and the pico cell has a radius of about a few dozen meters. In the following description, the terms 'pico cell' and 'small cell' are used interchangeably.

Returning to FIG. 4, the eNB 1 405 is the MeNB, the eNB 2 415 is the SeNB, the serving cell 410 with the center frequency f1 is the serving cell 410 belonging to the MCG, and the serving cell 420 with the center frequency f2 is the serving cell 420 belonging to the SCG.

In the following description, the terms 'MCG' and 'SCG' may be substituted by other terms. For example, the terms 'primary set' and 'secondary set' or 'primary carrier group' and secondary carrier group' may be used instead of the terms 'primary set' and 'secondary set.' It should be noted that although the terms are different from each other they have the same meaning. The purpose of using such terms is to determine whether a cell is under control of the eNB which controls the PCell of a specific UE 407, and the corresponding UE 407 and cell operate differently depending on whether it is under control of the eNB which controls the PCell.

Although one or more SCGs can be configured to a UE 407, it is assumed that only one SCG is configured in the various embodiments of the present disclosure for explanation convenience. The SCG may include a plurality of SCells, and one of the SCells has special properties.

In the intra-eNB CA, the UE 407 transmits Hybrid ARQ (HARQ) feedback and Channel State Information (CSI) for the SCell as well as the HARQ feedback and CSI for the PCell through a Physical Uplink Control Channel (PUCCH) of the PCell. This aims to apply the CA operation to the UE 407 having no capability of simultaneous uplink transmission.

In the inter-eNB CA, it may be actually impossible to transmit HARQ feedbacks and CSIs of the SCG SCells through PUCCH of the PCell. This is because the HARQ feedback has to be delivered in the HARQ Round Trip Time (RTT) (typically 8 ms) but the transmission delay between the MeNB and SeNB may be longer than the HARQ RTT. For this reason, PUCCH transmission resource is configured for one of the SCells belonging to the SCG to transmit the HARQ feedbacks and CSIs for the SCG SCells. The primary SCell is referred to as pSCell. In the following description, the terms 'inter-eNB CA' and 'DC' are used interchangeably. A description is made of connection structures of a PDCP entity in the LTE system according to an embodiment of the present disclosure.

Figure 5:
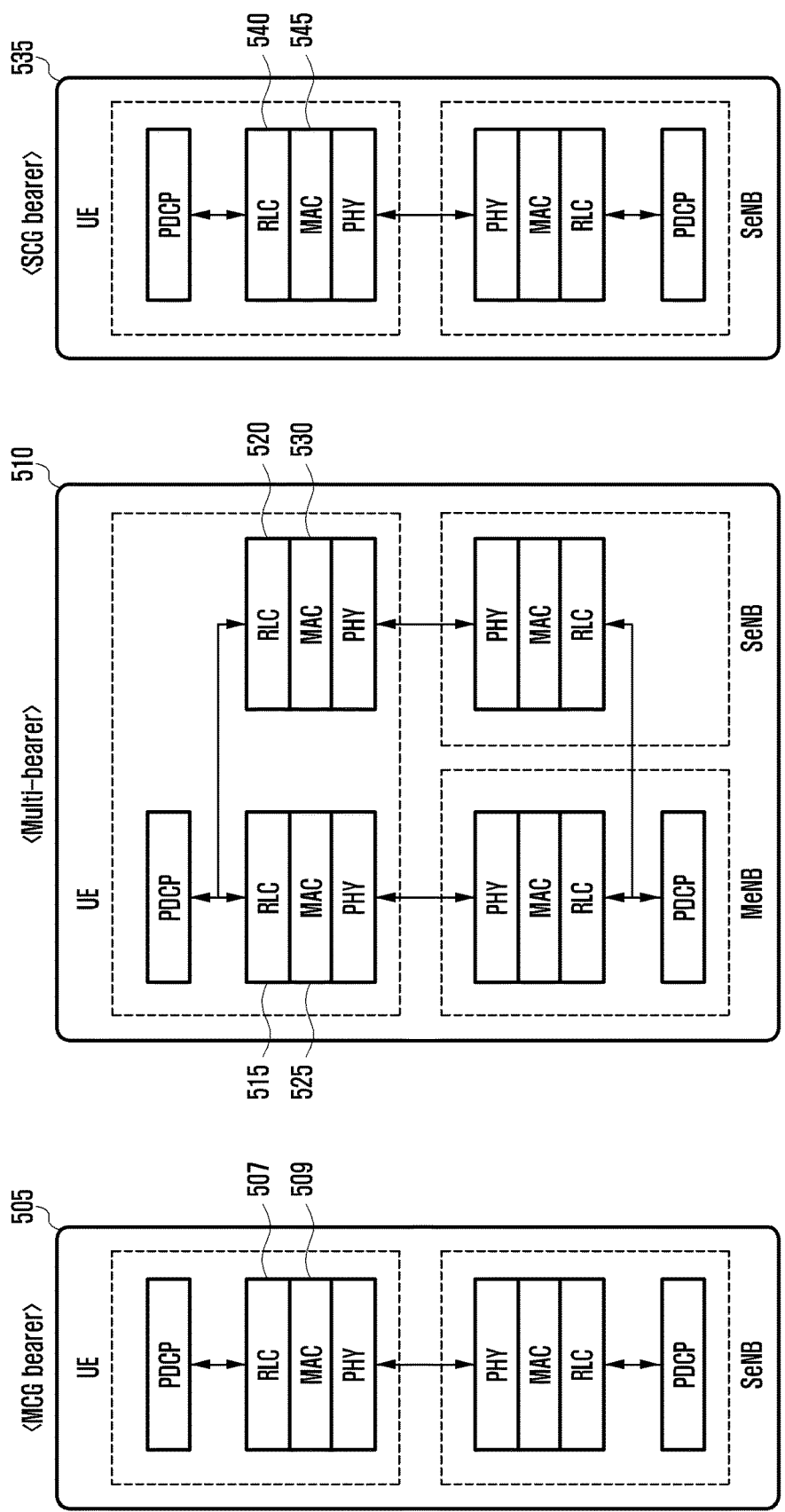
FIG. 5 is a diagram illustrating connection structures of a Packet Data Convergence Protocol (PDCP) entity in the LTE system according to an embodiment of the present disclosure.

FIG. 5 is a diagram illustrating connection structures of a PDCP entity in the LTE system according to an embodiment of the present disclosure.

Referring to FIG. 5, a user service is provided through one Evolved Packet System (EPS) bearer which is connected to one Radio Bearer. There is one PDCP and RLC per radio bearer and, in the inter-eNB CA, the PDCP entity and RLC entity of one radio bearer are located at different eNBs to improve data transmission/reception efficiency. At this time, it is necessary to consider different approach depending on the type of the user service.

In the case of the massive data service, it is possible to establish two RLC entities to transmit/receive user service data to and from both the MeNB and SeNB as denoted by reference number 510. In the case of the service demanding strict requirements such as Voice over LTE (VoLTE), it is possible to establish the RLC entity at only the MeNB so as to transmit/receive user service data through the serving cell of only the MeNB as denoted by reference number 505. It is also possible to establish the bearer to transmit/receive data through the serving cells of only the SeNB as denoted by reference number 535.

For explanation convenience, the bearer for transmitting/receiving data through the serving cells of only the MeNB as denoted by reference number 505 is referred to as MCG bearer, the bearer as denoted by reference number 510 is referred to as multi-bearer, and the bearer for transmitting/receiving data through the serving cells of only the SeNB is referred to as SCG bearer. The PDCP entity of the MCG bearer or the SCG bearer is connected to one RLC entity, and the PDCP entity of the multi-bearer is connected to two RLC entities. The RLC entity for transmitting/receiving data through MCG (or connected to the MAC entity associated with the serving cells of the MCG) as denoted by reference numbers 507 and 515 is referred to as MCG RLC entity, and the RLC entity for transmitting/receiving data through the SCG as denoted by reference number 520 and 540 is referred to as SCG RLC entity. The MAC entity associated with the data transmission/reception through the MCG as denoted by reference number 509 and 525 is referred to as MCG MAC entity, and the MAC entity associated with the data transmission/reception through the SCG as denoted by reference number 530 and 545 is referred to as SCG MAC entity. The MAC and RLC entities are connected through a logical channel and, in detail, the logical channel between the MCG RLC entity and the MCG MAC entity is referred to as MCG logical channel, and the logical channel between the SCG RLC entity and the SCG MAC entity is referred to as SCG logical channel. For explanation simplicity, it is assumed that the macro cell area is the area where only the macro cell signal is received but the small cell signal is not received, and the small cell area is the area where both the macro and small cell signals are received. When the UE which demands large downlink data moves from the macro cell area to the small cell area, it is possible to configure additional small cells to the UE and, among the bearers established for the UE, reconfigure the MCG bearer carrying large amount of downlink data such as File Transfer Protocol (FTP) as the multi-bearer or SCG bearer.

In order for the UE to operate correctly in a given communication network, it is necessary to report the information on the capability of the UE (hereinafter, referred to as capability information) to the network (or at least one specific network node). The capability information may include the features and frequency bands supported by the UE. As the UE improves in capability and integrates more and more new features such as CA are introduced, the complexity and size of the UE capability information will also increase.

In order for a UE to report the DC capability to the network, it necessary to check various types of information as follows:

Which band combinations are available for supporting DC? Multi-bearer is supported?

SCG bearer is supported?

Which cell group combinations are supported?

Which serving cells are available for PUCCH transmission?

If the UE supports SCG bearer configuration, this means that the UE has the capability of encrypting and decrypting MCG bearer data with a first security key and encrypting and decrypting SCG bearer data with a second security key.

If the UE supports multi-bearer configuration, this means that the UE has the capability of connecting one PDCP entity to two RLC entities to transmit/receive data.

The UE reports the information per band combination supporting DC as follows:

Information indicating whether it supports the multi-bearer for the corresponding band combination and has completed Inter-Operability Testing (IOT) for the multi-bearer.

Information indicating whether it supports the SCG bearer for the corresponding band and has completed IOT for the SCG bearer.

Information indicating whether it supports unsynchronized network for the corresponding band combination.

Information indicating the serving cells of the corresponding band combination which are available for PUCCH transmission (hereinafter, referred to as PUCCH capability information).

Information indicating the serving cell group configuration available for the corresponding band combination (hereinafter, referred to as cell group capability information).

The IOT is testing interoperability between a UE and the network, and it is preferable to use only the functions which have passed the test. Since both the commercialized UE and the network are necessary for the IOT, if, although a certain function is implemented in the UE, it is not implemented widely enough, the IOT may not be performed. Particularly in the DC applied per band combination, if there is no network utilizing the corresponding band combination yet or if, although any network utilizes the corresponding band combination, it supports just one of the SCG bearer and multi-bearer, the IOT cannot be performed perfectly and even the UE supporting both the SCG bearer and multi-bearer may be able to perform IOT for one of the two in a certain band combination. If the UE does not report the IOT situation per bearer configuration, the eNB cannot check the bearer configuration to which the IOT has been performed such that the DC operation may be restricted. Thus the UE has to generate the capability information including the information on the bearer configuration to which IOT has completed per band combination by reflecting the IOT situation.

The DC operation can be performed in a synchronized network (network in which the distance between subframe boundaries of downlink signals of the serving cells is less than a predetermined threshold, e.g., about 30 micro seconds) or an unsynchronized network (network in which there is no restriction in distance between subframe boundaries of downlink signals of the serving cells and thus the distance between subframe boundaries of downlink signals of the serving cells may increase up to 500 micro seconds). Unlike the synchronized network for which the capacity of the signal storage of the reception Radio Frequency (RF) circuit of the UE can be designed in consideration of only the time difference, since the time difference of up to 0.5 ms should be considered in the unsynchronized network, the UE may be able to operate in the synchronized network or both the synchronized and unsynchronized networks. All the UEs supporting DC have to support the operation in the synchronized network basically. Thus there is no need to indicate synchronized network supportability explicitly. Since whether to support unsynchronized networks depends on the UE, it is necessary to report unsynchronized network supportability indication. Whether the UE supports unsynchronized networks is indicated per band combination in association with IOT.

For DC operation, the UE has to have the capability of transmitting PUCCH through at least two serving cells. When the DC is supported in a band combination, the information indicating which serving cell of the band combination can be used to transmit PUCCH is referred to as PUCCH capability information.

Since the PUCCH capability information about a band combination indicates whether which two cells can be used for PUCCH transmission among the serving cell configurable in the corresponding band combination, as the number of band entries included in the band combination increases and as the bandwidth class (see TS36.101 and TS26.331) rises, the number of combination increases, and thus indicating which combinations can be used for PUCCH transmission one by one among all the combinations is likely to increase the signaling overhead significantly. For example, assuming a band combination in which band X which is capable of configuring two serving cells, band Y which is capable of configuring two serving cells, and band Z which is capable of configuring one serving cell; the number of cases for selecting 2 of the 5 serving cells is 20. In order for the UE to indicate one combination for PUCCH transmission among the 20 combinations, 20-bit information is needed. By taking notice that a UE can report up to 128 combinations, the overhead is too high to allow.

The present disclosure defines the most frequently used combinations, rather than taking all the cases into consideration, and associates the DC operation supportability. That is, if the UE has reported that it supports DC in a certain band combination, this means that the UE supports at least basic PUCCH capability in the band combination. The basic PUCCH capability means that the PUCCH can be transmitted (or PUCCH can be configured) through the serving cells fulfilling a predetermined condition in 'combination of two serving cells' available in the corresponding band combination. If PUCCH transmission is supported in a combination without the basic PUCCH capability, the UE reports the capability information including extra information.

The combination corresponding to the basic PUCCH capability (hereinafter, referred to as basic combination) is defined depending on the number of band entries (band parameter (BP), number of BPs) as follows.

Basic combination of band combination with one band entry: all of two-cell combinations are basic combinations. For example, if a Band Combination Parameter (BCP) includes one band entry and the bandwidth class of the band entry supports up to 3 serving cells, this means that the combinations of [cell 1+cell 2], [cell 1+cell 3], and [cell 2+cell 3] are available and all of the three combinations allow for PUCCH configuration.

Basic combination for band combination with at least two band entries: combination of two serving cells belonging to different band entries is the basic combination. For example, in the band combination consisted of band X, band Y, and band Z; all of the two-serving cell combinations consisted of a band X serving cell and a band Y serving cell, all of the two-serving cell combinations consisted of a band X serving cell and a band Z serving cell, and all of the two-serving cell combinations consisted of a band Y serving cell and a band Z serving cell are basic combinations. That is, all of the combinations, with the exception of the combinations consisted of the serving cells belonging to one entry, are basic combinations.

As described above, in the case of the band combination with one band entry, the basic combination is the combination of the serving cells of the same band and, in the case of the band combinations with two or more band entries, the basic combination is the combination of the serving cells of different bands.

For DC operation, two serving cell groups should be configured. If the DC is supported in a band combination, the information indicating the serving cells that can be sorted into the same serving cell group in the band combination is referred to as cell group capability information. If all combinations for the cell group capability information is defined and all per-combination supportabilities are reported, this will increase signaling overhead significantly. In the present disclosure, configuring the cell groups in the combinations defined according to a predetermined rule is defined as basic cell group capability, and if a UE supports DC in a predetermined band combination, this means that the UE supports the basic capability too. That is, the UE checks the combinations corresponding to the basic cell group capability in a band combination and reports, only when it supports the basic cell group capability, that it supports DC in the corresponding band combination.

The basic cell group capability is defined differently depending on whether the number of band entries is one or two or more.

Basic cell group capability of band combination with one band entry: support all the cases configuring serving cells into two groups. For example, if a BCP includes one band entry and if the bandwidth class of the band entry supports up to 3 serving cells, all the cases of sorting cell 1 into a group and cells 2 and 3 into another group, sorting cells 1 and 2 into a group and cell 3 into another group, and sorting cells 1 and 3 into a group and cell 2 into another group are supported. This means that all of the two-cell groups available in one band entry can be configured.

Basic cell group capability of band combination with two or more entries: all cell groups, with the exception of the cases where the serving cells of one band entry are sorted into two serving cell groups, are basic cell groups. For example, the basic cell group capability of the band combination including band x, band y, and band z supports the cases of sorting the serving cells of the band x into one cell group and the serving cells of the bands y and z into another cell group, sorting the serving cells of the bands x and y into one cell group and the serving cells of the band z into another cell group, and sorting the serving cells of the bands x and z into one cell group and the serving cells of the band y into another cell group, but does not support the case of sorting part of the serving cells of the band x into one cell group and remaining serving cells and the serving cells of the bands y and z into another cell.

Figure 6:
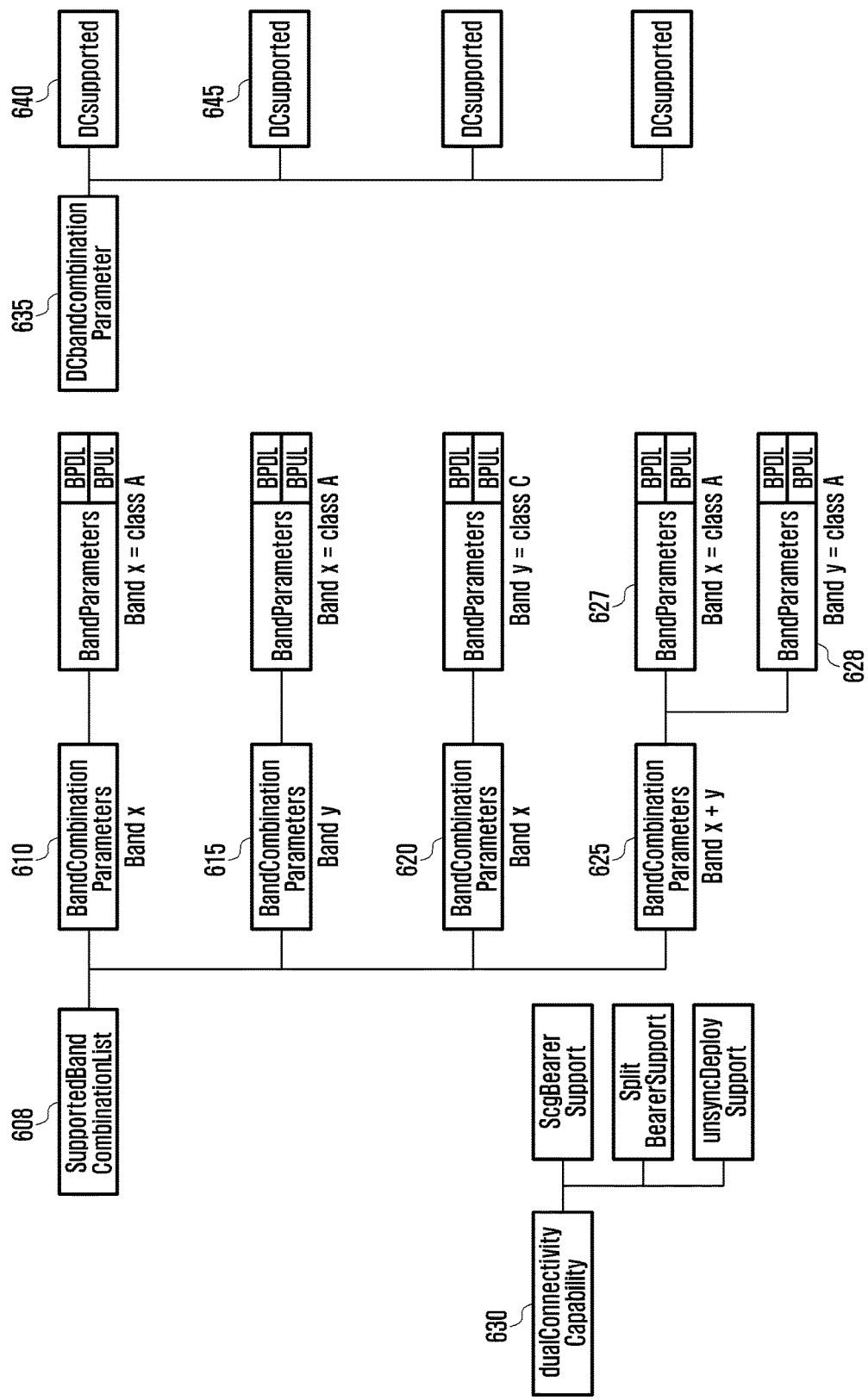
FIG. 6 is a diagram illustrating a configuration of User Equipment (UE) capability information for dual connectivity according to an embodiment of the present disclosure.

FIG. 6 is a diagram illustrating a configuration of UE capability information for DC according to an embodiment of the present disclosure.

Referring to FIG. 6, the multi-bearer supportability and SCG bearer supportability form are formed as per-UE information, and the DC supportability is formed as per-band combination information.

The UE capability information includes UE-supporting band combination (SupportedBandCombinationList) 608, DC band combination information (DCbandcombinationParameter) 635, and DC capability information (dualConnectivityCapability) 630.

The SupportedBandCombinationList 608 includes one or more BCPs (BandCombinationParameters; BCP) 610, 615, 620, and 625. The BCP is the information on the band combination supported by the UE. The BCP includes one or more BPs (BandParameters; BP) 627, 628. The BP includes band indicator (FreqBandIndicator, not shown), downlink BP (bandParametersDL; BPDL), and uplink BP (bandParametersUL; BPUL). The BPDL includes bandwidth class information (bandwidthClass, not shown) indicating a number of serving cells supported in the corresponding band and antenna capability information. Bandwidth class A indicates the capability capable of configuring one serving cell across the whole bandwidth up to 20 MHz, Bandwidth class B indicates the capability capable of configuring two serving cells with total bandwidth of up to 20 MHz, and Bandwidth class C indicates the capability capable of configuring two serving cells with total bandwidth of up to 40 MHz.

The dualConnectivityCapability 630 includes the SCG bearer configuration supportability information (ScgBearerSupport), multi-bearer configuration supportability information (SplitBearerSupport), and unsynchronized-network operation supportability (unsyncDeploySupport). The unsyncDeploySupport indicates whether the UE supports DC operation in two serving cells although the distance between a downlink subframe (subframe x) of a serving cell and a subframe (subframe y) closest to the subframe x of the serving cell on the time axis among the downlink subframes of another serving cell becomes equal to a predetermined value (e.g., 0.5 ms). That is, it indicates whether the UE supports DC operation in the subframes x and y although the distance between the boundaries of the subframes x and y is widened up to 0.5 ms.

The DCbandcombinationParameter includes at least one DCsupported 640 or 645, and the number of DCsupporteds is equal to the number of BCPs of the SupportedBandCombinationList. The DCsupporteds match BCPs one by one in order. For example, the first DCsupported 640 is the information on the first BCP 610. If the DCsupported indicates 'Yes', this means that the UE supports DC in the band combination of the corresponding BCP and basic PUCCH capability and basic cell group capability in the corresponding band and has completed IOT in association with DC. At this time, the details of the DC operation follows the indication of the dualConnectivityCapability. That is, if the dualConnectivityCapability indicates that the UE supports CSG bearer configuration and operation in the unsynchronized network, this means that the above operation is supported in the band combination and the IOT related to the operation has been completed.

Figure 7:
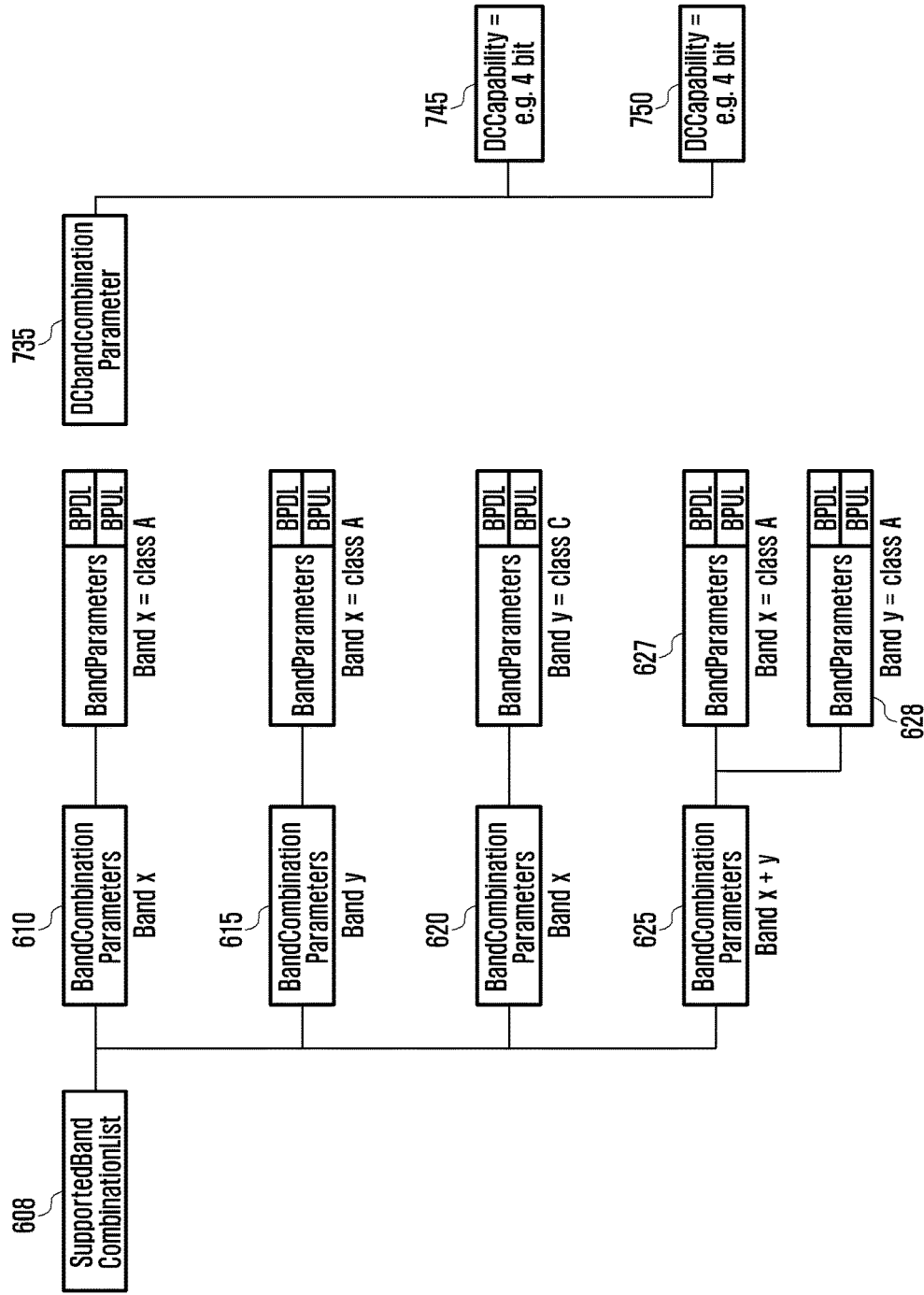
FIG. 7 is a diagram illustrating a configuration of UE capability information for dual connectivity according to an embodiment of the present disclosure.

FIG. 7 is a diagram illustrating a configuration of UE capability information for DC according to an embodiment of the present disclosure.

Referring to FIG. 7, the multi-bearer supportability and SCG bearer supportability are signaled per band combination.

The UE capability information includes UE-supporting band combination (SupportedBandCombinationList) 608 and DC capability information (dualConnectivityCapability) 730.

The dualConnectivityCapability includes one or more DC capability (DCCapability) 745 and 750. The number of DCCapability informations is equal to the number of BCPs fulfilling a predetermined condition. The predetermined condition is associated with CA and includes at least two BPs (BandParameter) or band entries, or a BCP including a band entry of which bandwidth class is not A, or the BCP includes at least two band entries.

The DCCapability corresponds to the BCP fulfilling the condition in the order of the arrangement of the BCP. For example, DCCapability 745 corresponds to the BandCombinationParameters 620, and the DCCapability 750 corresponds to the BandCombinationParameters 625.

The DCCapability includes at least 4 types of information. The first information indicates whether the DC is supported on the corresponding band, the second information indicates whether bearer configuration is supported and IOT has been performed, the third information indicates whether multi-bearer is supported and IOT has been performed, and the fourth information indicates whether unsynchronized network operation is supported and IO has been performed. If the first information is set to 'support', this means that the UE supports DC on the corresponding band. In more detail, this means that the 'basic PUCCH capability' and 'basic cell group capability' are supported in the corresponding band combination.

If the second information is set to 'support', this means that the UE supports SCG bearer configuration in the corresponding band combination and the IOT for the SCG bearer configuration has been completed.

If the third information is set to 'support', this means that the UE supports multi-bearer configuration in the corresponding band combination and the IOT for the multi-bearer configuration has been completed.

If the fourth information is set to 'support', this means that the UE supports unsynchronized network operation in the corresponding band combination and the IOT therefor has been completed.

Figure 8:
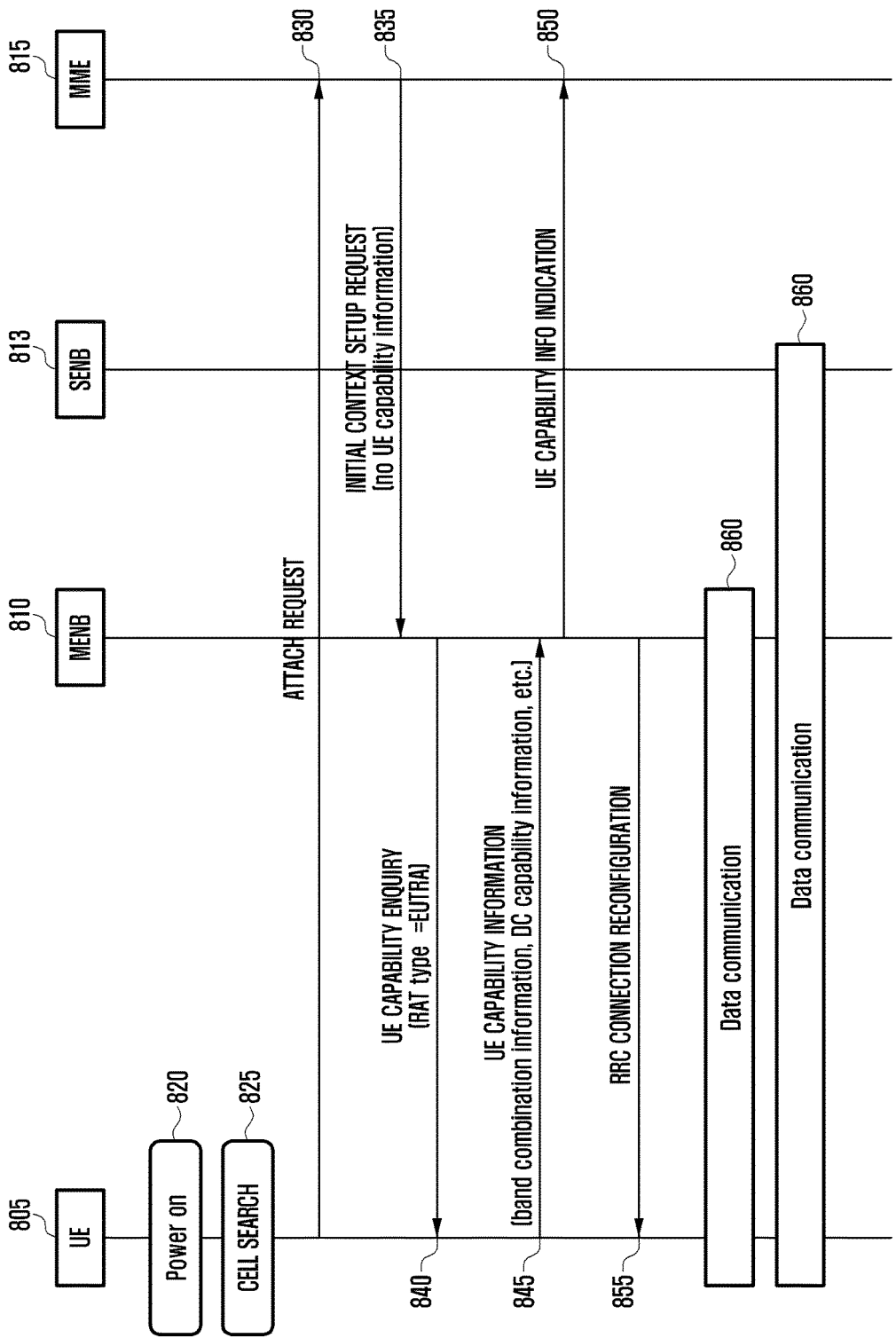
FIG. 8 is a signal flow diagram illustrating a dual connectivity configuration method according to an embodiment of the present disclosure.

FIG. 8 is a signal flow diagram illustrating a DC configuration method according to an embodiment of the present disclosure.

Referring to FIG. 8, in a mobile communication system including a UE 805, an MeNB 810, an SeNB 813, and an MME 815. The UE 805 powers on at operation 820. The UE 805 searches for the cells transmitting electric wave and a Public Land Mobile Network (PLMN) and determines the PLMN and the cell for performing an attach process at Cell Search operation 825.

The UE 805 performs a Radio Resource Control (RRC) connection setup process and then sends the MME 815 a control message requesting for registration (ATTACH REQUEST) at operation 830. The ATTACH REQUEST includes a UE identifier. If the ATTACH REQUEST is received, the MME 815 determines whether to accept the request and, if it is determined to accept, sends the serving eNB (MeNB) 810 of the UE a control message (Initial Context Setup Request) at operation 835. If the MME has the UE capability information, the Initial Context Setup Request message may include the UE capability information, but the MME has no UE capability information in the initial attach process. If the Initial Context Setup Request message including no UE capability information is received, the MeNB 810 sends the UE 805 a control message (UE CAPABILITY ENQUIRY) at operation 840. The UE CAPABILITY ENQUIRY message is a message for requesting the UE to report UE capability with a parameter call Radio Access Technology (RAT) Type enquiring specific RAT capability of the UE. If the UE is performing the above procedure in an LTE network, the RAT Type is set to Evolved Universal Terrestrial Radio Access (EUTRA). If there is another type of radio network such as UMTS network, the MeNB 810 may request the UE for the UMTS capability information by adding an RAT Type set to UTRA for preparing handover afterward.

If the UE CAPABILITY ENQUIRY message is received, the UE 805 generates a UE CAPABILITY INFORMATION message including its capability information about the radio technology indicated by the RAT Type. This message includes one or more band combination information per band combination supported by the UE 805. The band combination information indicates the CA combination supported by the UE, and the MeNB 810 configures an appropriate CA to the UE 805 based on this information. The UE CAPABILITY INFORMATION message includes the UE's DC capability information, and the UE 805 configures the DC capability information in consideration whether it supports DC supportability per band combination, whether IOT has been performed, and whether it supports basic capabilities.

The UE 805 sends the MeNB 810 a UE CAPABILITY INFORMATION message at operation 845. The MeNB 810 forwards the UE CAPABILITY INFORMATION message to the MME 815 at operation 850. The MeNB 810 reconfigures the UE 805 appropriately by referencing the traffic condition or channel condition of the UE 805 based on the capability information reported by the UE 805. For example, the MeNB 810 configures additional SCell or DC operation to the UE 805. The DC operation is configured in consideration of the UE's DC capability. For example, the MeNB 810 determines band combination for DC, cell groups, PUCCH, and bearers by referencing the DC capability reported by the UE 805. The MeNB 810 sends an RRC Connection Reconfiguration message at operation 855.

Once the DC is configured, the UE 805 performs data communication with the MeNB 810 and the SeNB 813 simultaneously at operation 860.

Figure 9:
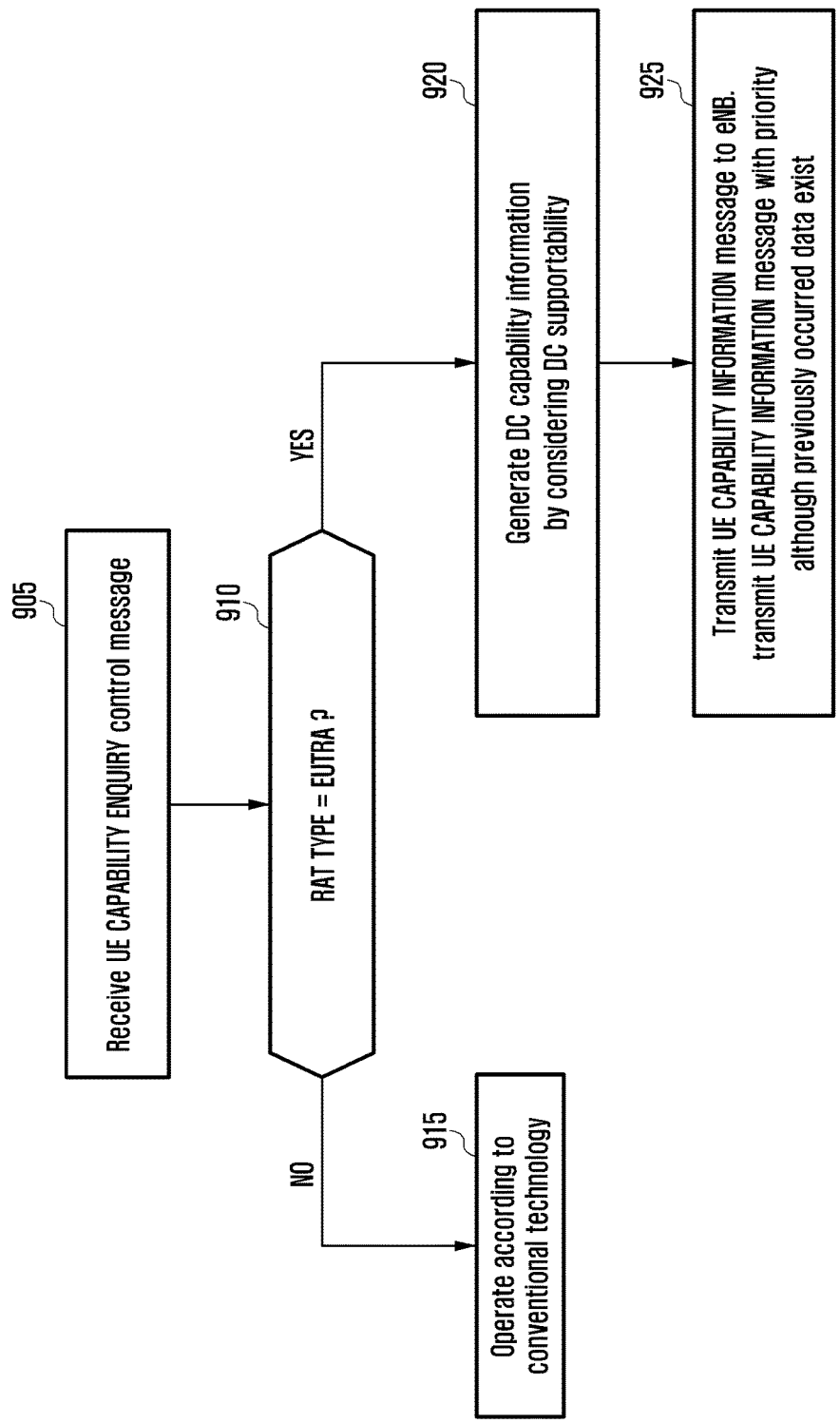
FIG. 9 is a flowchart illustrating a UE capability report procedure in the dual connectivity configuration method of FIG. 8 according to an embodiment of the present disclosure.

FIG. 9 is a flowchart illustrating a UE capability report procedure in the DC configuration method of FIG. 8 according to an embodiment of the present disclosure.

Referring to FIG. 9, if a UE CAPABILITY ENQUIRY message is received at operation 905, the UE checks the RAT Type included in the message at operation 910. In an alternative embodiment of the present disclosure, the UE determines to report capability information according to a predetermined condition and then the procedure goes to operation 920.

If the RAT Type is set to EUTRA, the procedure goes to operation 920 and, otherwise, operation 915. At operation 915, the UE operates according to the related art. At operation 920, the UE performs the operation for transmitting the UE CAPABILITY INFORMATION message including its capability information generated as described above to the eNB. The UE capability information includes SupportedBandList, SupportedBandCombinationList, and DCbandcombinationParameter coded with ASN.1; and the UE configures the information in consideration of the band combinations supporting DC along with information on whether IOT has been performed in the band combinations, basic PUCCH capability in the corresponding combination, and basic call group capability supportability.

The UE generates the UE CAPABILITY INFORMATION message including the above information and sends this message to the eNB at operation 925. At this time, although there is any user data (e.g., IP packet or voice frame) occurred previously, the UE transmits the UE CAPABILITY INFORMATION message with priority.

Second Embodiment

The second embodiment of the present disclosure is directed to the UE operation when downlink or uplink failure occurs at the UE to which multi-bearer is configured. The downlink failure means a situation in which the downlink channel state level of a serving cell which is equal to or less than a predetermined threshold continues over a predetermined duration, and the uplink failure means a situation in which random access failure occurs in a serving cell. If the downlink or uplink failure occurs in the PCell, this means that Radio Link Failure (RLF) occurs; and if the downlink or uplink failure occurs in the pSCell, this means that SCG-RLF occurs. If the downlink or uplink failure occurs at the UE to which multi-bearer is configured, the UE changes the uplink transmission configuration of the multi-bearer by itself to minimize uplink transmission termination.

Figure 10:
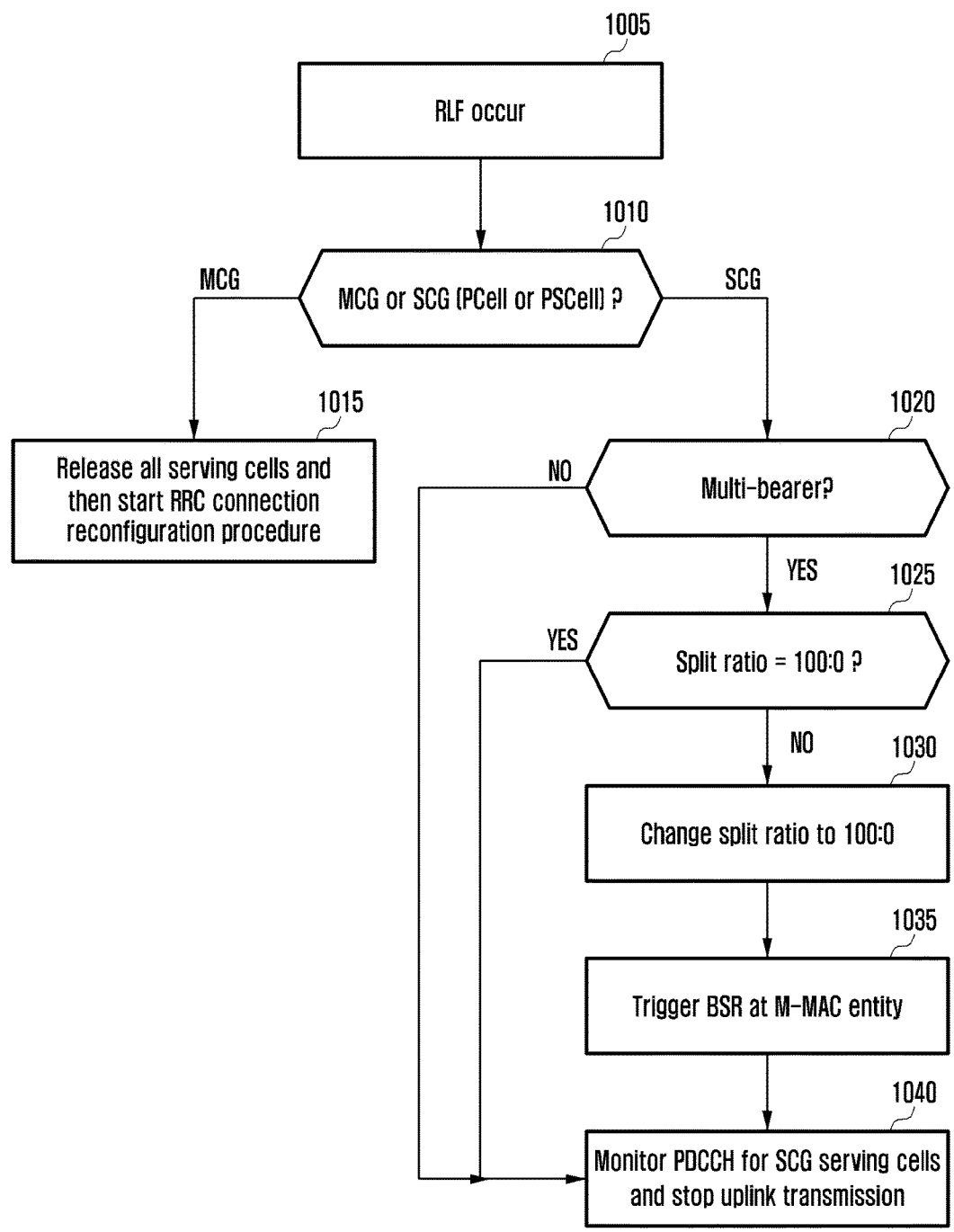
FIG. 10 is a flowchart illustrating a UE operation according to an embodiment of the present disclosure.

FIG. 10 is a flowchart illustrating a UE operation according to the second embodiment of the present disclosure.

If RLF occurs at operation 1005, the procedure goes to operation 1010. If RLF occurs, this means that downlink or uplink failure occurs in the PCell or pSCell.

The UE determines whether the RLF has occurred in the MCG (or PCell) or an SCG (or pSCell) at operation 1010. If the RLF has occurred in the MCG (or PCell), the procedure goes to operation 1015 and, otherwise if the RLF has occurred in the SCG (or pSCell), the procedure goes to operation 1020.

At operation 1015, the UE releases all of the MCG and SCG serving cells and starts an RRC Connection Reestablishment procedure. The RRC Connection Reconfiguration procedure is the procedure of releasing the current RRC connection and searches for a new serving cell to establish an RRC connection as specified in TS36.331.

At operation 1020, the UE determines whether the currently configured bearers include any multi-bearer. If any multi-bearer exists, the procedure goes to operation 1025 and, otherwise, the procedure goes to operation 1040.

At operation 1020, the UE determines whether the downlink split ratio (percentage) of the multi-bearer is 100:0; and if so, the procedure goes to operation 1040 and, otherwise the procedure goes to operation 1030. The uplink split ratio is the ratio between the numbers of PDCP PDUs transmitted through the MCG and SCG and notified from the eNB to the UE in configuring the multi-bearer. If the uplink split ratio is 100:0, this means that all (100%) of the PDCP PDUs are transmitted through the MCG while the non-PDCP signal such as RLC control signals is transmitted through the SCG.

If the procedure goes to operation 1030, this means that the uplink split ratio is not 100:0 and all or part of the PDCP data are transmitted through the SCG. For example, if the uplink split ratio is 0:100, this means that the all of the PDCP data are transmitted through the SCG. The UE adjusts the uplink split ratio to a predetermined value e.g., 100:0, at operation 1030. That is, the UE adjusts the uplink split ratio such that all of the PDCP data are transmitted through the MCG.

Then the UE triggers a Buffer Status Report (BSR) by means of a Multimedia MAC (M-MAC) entity at operation 1035. In the DC operation, two MAC entities are established in the UE: M-MAC entity associated with the MCG and S-MAC entity associated with the SCG.

If the M-MAC entity triggers the BSR, this means that the UE generates a BSR as a control message indicating data amount available currently for the UE and transmits the BSR through the MCG. Since adjusting the uplink split ratio at operation 1030 may change the data amount transmitted through the MCG, the UE triggers BSR by means of the M-MAC entity to notify the MeNB scheduler of this quickly.

The UE stops monitoring PDCCH for the SCG serving cells and uplink transmission through the SCG serving cells at operation 1040. The UE also discards the uplink and downlink data stored in the HARQ buffers of the SCG serving cells.

Third Embodiment

The third embodiment of the present disclosure is directed to the UE operation when the Timing Advance (TA) timer of the UE to which DC is configured expires. The UE determines the action it takes based on the TA Group (TAG) identifier of the TAG of which TA timer has expired.

A TAG is a set of serving cells sharing a same uplink transmission timing. A TAG is categorized into one of Primary TAG (P-TAG) and Secondary TAG (S-TAG). The P-TAG is the TAG including the PCell, and the S-TAG is the TAG including SCells with the exception of the PCell. If a serving cell belongs to a TAG, the uplink transmission timing of the serving cell is identical with the uplink transmission timings of the other serving cells belonging to the TAG and the uplink synchronization of the serving cell is determined based on the TA time of the TAG.

The uplink transmission timing of a TAG is determined through a random access procedure in a serving cell of the TAG and maintained by receiving a TA command. Whenever the TA command is received in a TAG, the UE starts or restarts the TA timer of the corresponding TAG. If the TA timer expires, the UE determines that the uplink transmission synchronization of the corresponding TAG is lost and thus suspends uplink transmission until the random access is performed again.

Each TAG is allocated a TAG identifier which is an integer in the range from 0 to 3.

The UE operating in the DC mode may be configured with at least two TAG. Since the TAG is established per eNB independently, not all of the serving cells can be grouped in one TAG.

In the present disclosure, the MeNB and SeNB configure such that the PCell and pSCell belong to different TAGs and allocate a TAG identifier of 0 to the TAGs to which the PCell and pSCell belong respectively.

The UE operates the TA timer per TAG and, if a TA command is received through a serving cell, applies the TA command to the TAG indicated by the TA identifier in the TA command and restarts the TA timer of the corresponding TAG. At this time, the UE determines the TAG associated with the TA command in consideration of the serving cell group including the serving cell through which the TA command is received. For example, if the TA command is received through the SCG, the UE applies the TA command to the TAG having the identifier matching the identifier included in the TA command among the TAGs comprised of the SCG serving cells. For example, if a TA command with the TAG identifier of 0 is received through the MCG, the TA command is associated with a TAG including the PCell; and if a TA command with the TAG identifier of 0 is received through the SCG, the TA command is associated with the TAG including the pSCell.

Figure 11:
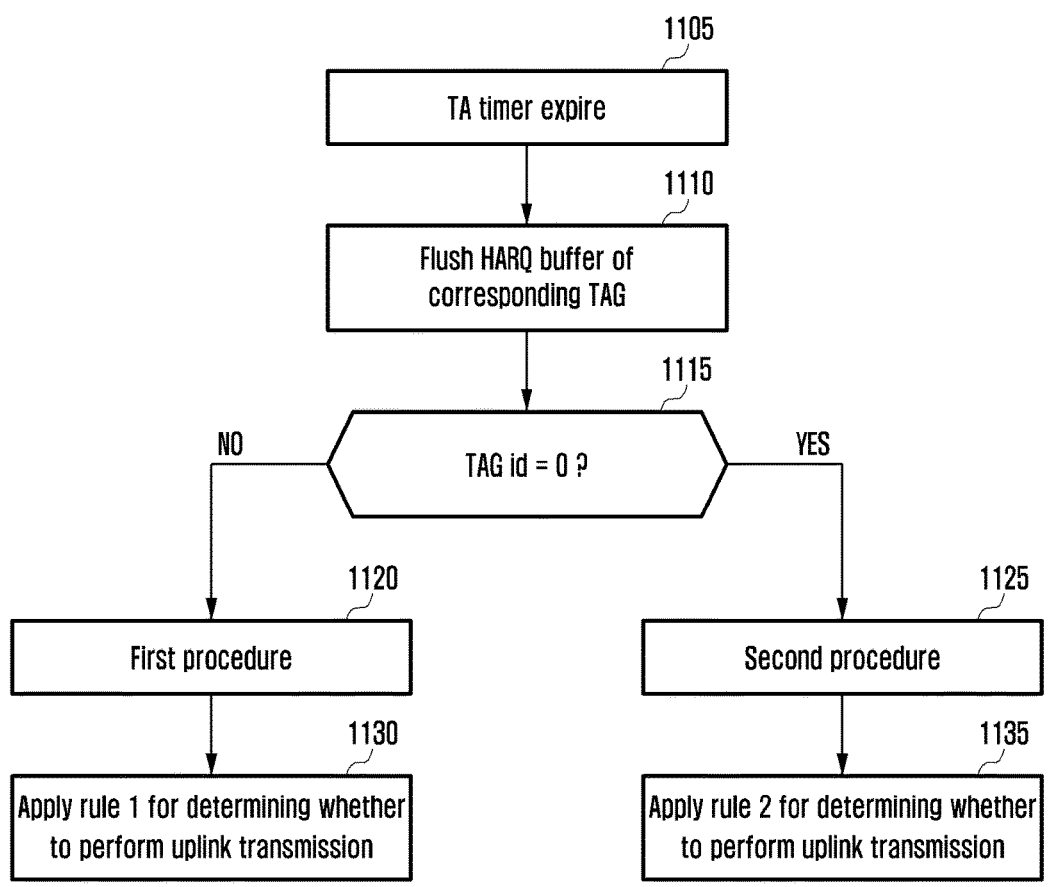
FIG. 11 is a flowchart illustrating a UE operation when the Timing Advance (TA) timer of a TA Group (TAG) expires according to an embodiment of the present disclosure.

FIG. 11 is a flowchart illustrating a UE operation when the TA timer of a TAG expires (i.e., no TA command is received while the TA timer is running) according to an embodiment of the present disclosure.

A timeAlignmentTimer (TAT) expires at a certain timing at operation 1105. The TAT is set per TAG. The TAT of a TAG starts first in the initial random access procedure of the TAG and restarts whenever a TA command for the TAG is received. While the TAT does not run, the uplink signal transmission, with the exception of the preamble transmission, is prohibited in the corresponding TAG. If the TAT expires, this means that no TA command has been received for the TAG during the period defined by the TAT.

The UE flushes the HARQ buffers of the serving cells belonging to the corresponding TAG at operation 1110. This is done to prevent non-adaptive HARQ retransmission from being performed in the corresponding SCell.

The UE determines whether the TAG identifier is 0 at operation 1115. If the TAG identifier of the TAG of which TAT has expired is not 0, the procedure goes to operation 1120 for the first procedure and, otherwise if the TAG identifier is 0, operation 1125 for the second procedure.

The first procedure is taken when the TAT of the TAG through which PUCCH is transmitted is expired and, in this procedure, the UE releases the PUCCH and SRS transmission resources of a cell of the cell group including the TAG and stops the TATs of the rest TAGs of the cell group including the TAG. The UE flushes the HARQ buffers of all serving cells of the cell group including the TAG. This is done to prevent any uplink transmission from being performed in the corresponding cell group. If Semi-Persistent Scheduling (SPS) is configured, the UE stops the SPS. That is, the configured uplink grant and downlink assignment are released. SPS is a technique of allocating transmission resource semi-persistently to minimize transmission resource allocation signal overhead for service generating small packets periodically such as VoIP and thus, if transmission resource is allocated once, it can be used until a predetermined control signal is received or a predetermined condition for releasing the resource is fulfilled.

The second procedure is taken when the TAT of the TAG through which no PUCCH is transmitted expires and, in this procedure, the UE stops SRS transmission in the serving cells belonging to the TAG and releases the SRS transmission resource.

The procedure goes from operation 1120 to operation 1130 to apply rule 1 to determine whether to perform uplink transmission in a serving cell.

The procedure goes from operation 1125 to operation 1135 to apply rule 2 to determine whether to perform uplink transmission in a serving cell.

Rule 1: Do not prohibit uplink transmission in the cell groups with the exception of the cell group including the TAG of which TAT has expired, and prohibit uplink transmissions with the exception of predetermined uplink signal in the cell group including the TAG of which TAT has expired. The uplink transmission prohibition is released upon restart of the TAT. The predetermined uplink signal is the random access preamble signal of the pSCell in the TAG belonging to the SCG or the random access preamble signal of the PCell in the TAG belonging to the MCG.

Rule 2: Do not prohibit uplink transmission in the serving cells with the exception of the serving cells belonging to the serving cells belonging to the TAG of which TAG has expired and prohibit uplink transmissions with the exception of predetermined uplink signal for the serving cells belonging to the TAG of which TAT has expired. The uplink transmission prohibition is released upon restart of the TAT. The predetermined uplink signal is the random access preamble signal.

In an alternative embodiment of the present disclosure, the UE determines whether difference between the uplink subframes boundaries or difference between uplink transmissions timings of cell groups is greater than a predetermined threshold value and, if so, reports the determination result to the eNB.

Figure 12:
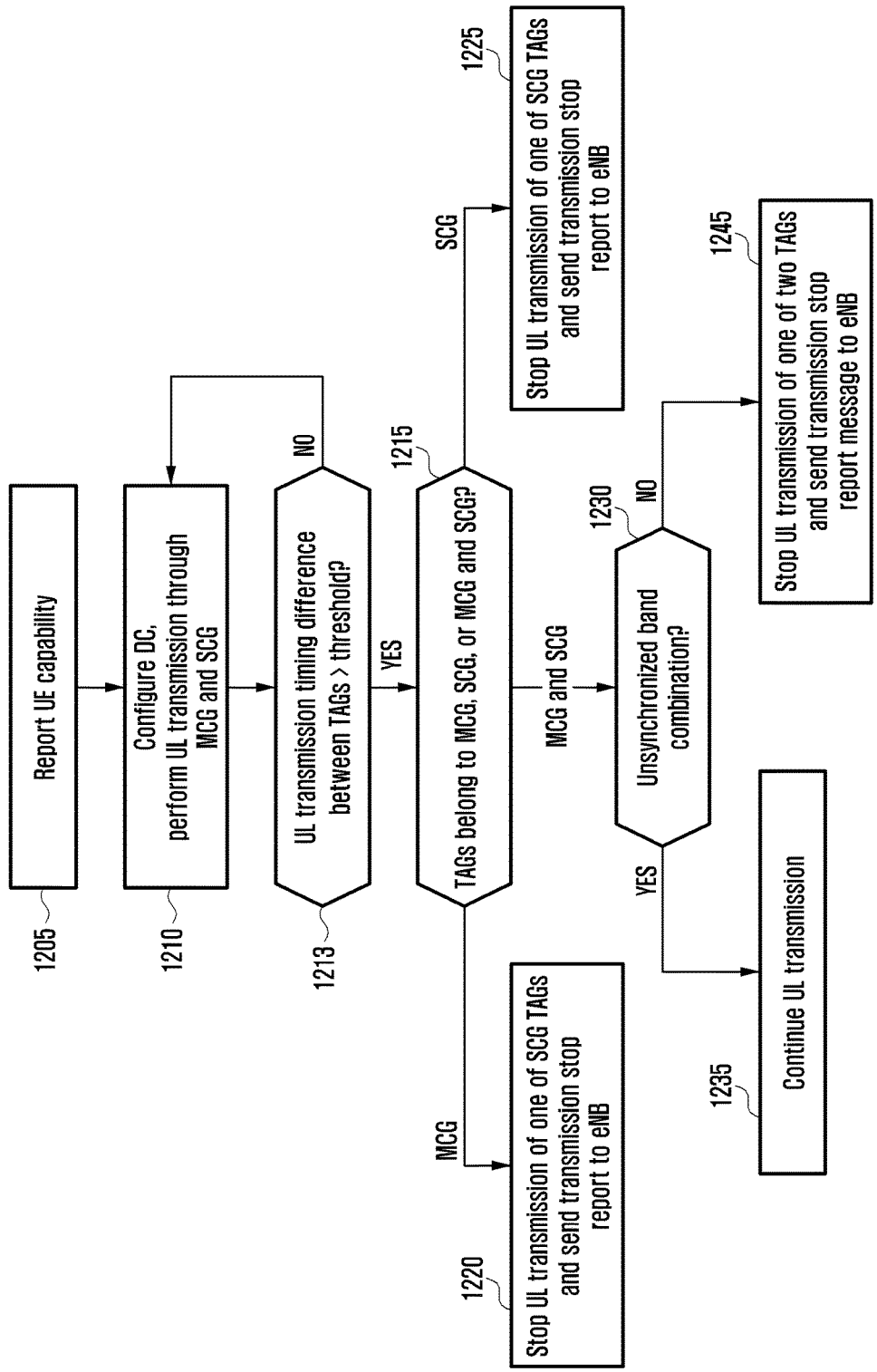
FIG. 12 is a flowchart illustrating another UE operation according to an embodiment of the present disclosure.

FIG. 12 is a flowchart illustrating another UE operation according to the third embodiment of the present disclosure.

Referring to FIG. 12, the UE reports its capability in response to a control message requesting for UE capability report at operation 1205. As described above with reference to operations 840 and 845, the UE may report the information whether it supports DC per band combination and reports unsynchronized network operability (unsynchronized operation supportability) per DC-supporting band combination.

The eNB configures DC of the UE at operation 1210. The UE configures MCG and SCG according to the instruction of the eNB and performs downlink reception and uplink transmission.

The UE determines whether the difference between uplink transmission timings of the TAGs in the course of uplink transmission through the MCG and SCG at operation 1213. For example, the UE determines whether the difference between the uplink transmission timing of a TAG (or uplink subframe boundary) and the uplink transmission timing of another TAG (or uplink subframe boundary) is greater than a threshold value. The two subframes being compared are the subframes overlapped most frequently on the time axis. The transmission timing (or uplink subframe boundary) of the TAG is adjusted when the UE receives a TA command from the eNB and thus, when the TA command for a TAG is received form the eNB, the UE adjusts the uplink transmission timing according to the command and determines whether the difference between the adjusted timing and the transmission timing of another TAG is greater than predetermined time. The predetermined time may be set, for example, to about 32 μsec.

If the difference between the transmission timings of the two TAGs (or difference between the subframe boundary of the first TAG and the uplink subframe boundary of the secondary TAG which is closest to the uplink subframe boundary of the first TAG) is greater than the predetermined value, the procedure goes to operation 1215.

Since the difference between the transmission timings of the two TAGs is greater than the threshold value, the UE stops uplink transmission of one of the two TAGs and sends the eNB a control message reporting the termination of uplink transmission. At this time, in order to determine the TAG in which the transmission is stopped and the information to be reported to the eNB, the UE checks the cell groups to which the two TAGs belong, respectively, at operation 1215. If both the two TAGs belong to the MCG, the procedure goes to operation 1220; if both the two TAGs belong to the SCG, the procedure goes to operation 1225; and if one TAG belongs to the MCG and another TAG belongs to the SCG, the procedure goes to operation 1230.

At operation 1220, if the two TAGs include the P-TAG, the UE stops uplink transmission in the TAG which is not the P-TAG. If the two TAGs include no P-TAG, the UE stops the uplink transmission of the TAG of which uplink transmission timing difference with the P-TAG is greater than that of the uplink transmission of the other TAG. The UE generates a control message including the identifier of the TAG in which the uplink transmission is stopped and the information indicating that the problematic cell group is the MCG and transmits the control message to the eNB.

At operation 1225, the UE determines whether the two TAGs include the S-TAG including the pSCell. If the two TAGs include the S-TAG including the pSCell, the UE stops the uplink transmission of the TAG which is not the S-TAG including the pSCell. If the two TAGs include no S-TAG including the pSCell, the UE stops the uplink transmission of the TAG of which uplink transmission timing difference with the S-TAG including the pSCell is greater than that of the uplink transmission of the other TAG. The UE generates a control message including the identifier of the TAG in which the uplink transmission is stopped and the information indicating that the problematic cell group is a SCG and transmits the control message to the eNB.

At operation 1230, the UE determines whether the band combination in which the current MCG and SCG are configured is a band combination supporting unsynchronized operation and, if so, continues the current TAG operation at operation 1235. Otherwise if the band combination in which the current MCG and SCG are configured is a band combination not supporting unsynchronized operation, the UE stops uplink transmission of one of the two TAGs and transmits a control message to the eNB at operation 1245. The control message includes the identifier of the TAG in which uplink transmission is stopped and the information on the cell group incurring the problem.

At operation 1230, the UE determines the TAG in which uplink transmission is stopped as follows.

If the two TAGs include the P-TAG, the UE stops the uplink transmission of the non-P-TAG. That is, the UE stops the uplink transmission of the TAG belonging to an SCG.

If the two TAGs include no P-TAG but S-TAG with the pSCell, the UE stops the uplink transmission of the S-TAG without pSCell, i.e., the uplink transmission of the S-TAG of the MCG.

If the two TAGs include neither the P-TAG nor the S-TAG with pSCell, the UE stops the uplink transmission of the S-TAG belonging to the SCG.

In an alternative embodiment of the present disclosure, if the TAGs belong to the same cell group, the UE stops the uplink transmission; and otherwise if the TAGs belong to different cell groups, the UE stops the uplink transmission and reports this to the MeNB. That is, if it occurs that the difference between the uplink transmission timings of the TAGs of the MCG is greater than a predetermined threshold, the UE stops the uplink transmission of one of the two TAGs; if it occurs that the difference between the uplink transmission timings of the TAGs of the SCG is greater than a predetermined threshold, the UE stops the uplink transmission of one of the two TAGs; and if it occurs that the difference between the uplink transmission timings of the TAG of the MCG and the TAG of the SCG is greater than a predetermined threshold, the UE stops the uplink transmission of one of the TAGs and transmits a control message to the eNB to report the situation.

In more detail, the UE stops the uplink transmission of the TAG which is not the P-TAG at operation 1220 and terminates the procedure. (i.e., the UE flushes the uplink HARQ buffer of the serving cell belonging to the TAG which is not the P-TAG and releases the Sounding Reference Signal transmission resource of the serving cell. If the UE flushes the HARQ buffer, this means that the data stored in the buffer are discarded). The UE stops the uplink transmission of the TAG which is not the P-TAG with the pSCell and terminates the procedure at operation 1225.

At operation 1240, the UE stops the uplink transmission through the one of the TAGs according to the above-described rule and transmits a transmission stop report message to the eNB. The transmission stop report message may include the TAG identifier of the TAG in which the uplink transmission is stopped and N_TA. The N_TA is the information specifying uplink transmission timing, i.e., the time difference between a predetermined downlink subframe and uplink subframe. For further details of N_TA, see TS36213. The transmission stop report message is transmitted to the MeNB through a serving cell of the MCG. If the TAG in which the uplink transmission is stopped is a TAG with the pSCell (i.e., if the transmission timing difference between the P-TAG and the TAG with the pSCell is greater than a predetermined threshold), the UE flushes the uplink HARQ buffers of all the serving cells belonging to the SCG, releases the Sounding Reference Signal transmission resources of all the serving cells belonging to the SCG, and releases the PUCCH and CSI transmission resources configured to the pSCell. If the TAG in which uplink transmission is stopped is an S-TAG without the pSCell, the UE flushes the uplink HARQ buffers of all the serving cells belonging to the corresponding TAG and releases the Sounding Reference Signals configured to the serving cells belonging to the TAG.

Fourth Embodiment

The fourth embodiment of the present disclosure is directed to the UE operation in which the UE operating in the DC mode activates an SCell. The activation/deactivation of an SCell is indicated by means of the Activation/Deactivation (A/D) MAC Cyclic Extension (CE) (see TS36.321). Typically, an SCell is configured by means of an RRC control message in a deactivated state initially and then activated by means of the A/D MAC CE indicating activation of the SCell. Meanwhile, if the pSCell is activated by means of the A/D MAC CE, this causes a problem of delaying the random access procedure in the pSCell. In the present disclosure, the UE activates the pSCell when the RRC control message for configuring the pSCell (or RRC control message including pSCell configuration information) is received while it activates an SCell which is not pSCell when the A/D MAC CE is received. In the following description, the pSCell activation procedure is referred to as the first type activation procedure, and the normal SCell activation procedure is referred to as the second type activation procedure.

Table 1 specifies the first and second types activation procedures in detail.

TABLE 1

| First type activation procedure | Second type activation procedure |
|---|---|
| Initiated by receipt of RRC control message | Initiated by receipt of MAC control message |
| Report CSI after starting PDCCH monitoring | Start PDCCH monitoring after initiating CSI report |
| The UE starts random access in the pSCell after completing preparation for the pSCell activation. The UE monitors PDCCH for random access and starts CSI report after completing the random access procedure. | Since the CSI report is performed in the PCell or the pSCell other than the corresponding SCell and the eNB does not know when the CSI report is started, the UE starts CSI report without completion of the SCell activation and monitors PDCCH upon activation of the SCell. |

Monitoring PDCCH of an SCell may have the same meaning as receiving the PDCCH in the corresponding SCell and checking whether the scheduling information (downlink assignment or uplink grant) addressed to the Cell Radio Network Temporary Identity (C-RNTI) of the UE is received.

Reporting CSI (see TS36.211, 36.212. and 36.213) for an SCell has the same meaning as transmitting the control information indicating downlink channel status of the SCell through PUCCH. If the UE does not know the downlink channel state of the corresponding SCell at the timing of reporting CSI, it reports the CSI set to a predetermined value (e.g., 0).

The present disclosure defines the pSCell activation procedure and the normal SCell activation procedure differently so as to improve the SCell activation efficiency.

Figure 13:
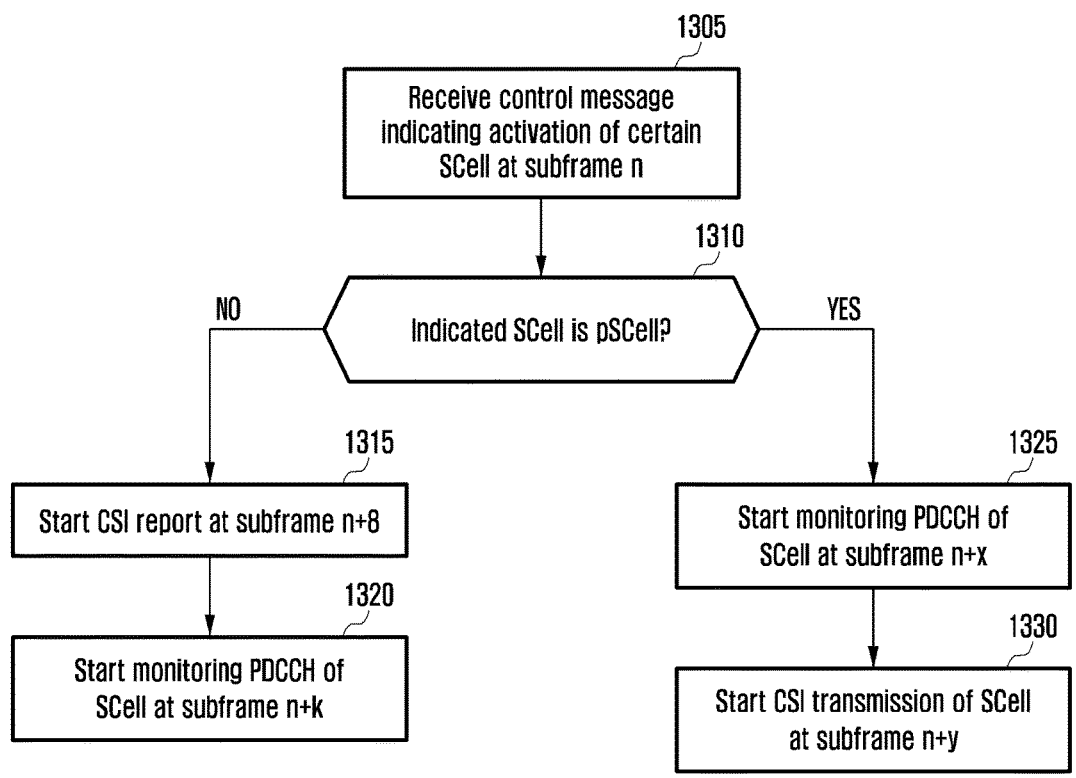
FIG. 13 is a flowchart illustrating the UE operation according to an embodiment of the present disclosure.

FIG. 13 is a flowchart illustrating the UE operation according to the fourth embodiment of the present disclosure.

The UE receives a control message indicating activation of an SCell at a subframe n at operation 1305. The control message may be an A/D MAC CE or an RRC control message including PCell activation information.

The UE determines whether the SCell to be activated is the pSCell at operation 1310. If the SCell to be activated is the pSCell, the procedure goes to operation 1325 and, otherwise, the procedure goes to operation 1315.

The UE starts CSI report for the SCell at predetermined timing, e.g., subframe n+8, at operation 1315. In more detail, the UE starts CSI report for the SCell at the first subframe in which the Physical Uplink Shared Channel (PUSCH) carrying CSI report for the SCell is configured among the subframes following the subframe n+8. The UE continues the activation operation (e.g., RF reconfiguration for downlink signal reception and uplink signal transmission in the SCell) and, if the activation is prepared completely, the procedure goes to operation 1320.

At operation 1320, the UE starts monitoring PDCCH of the SCell at subframe n+k. Here, k is an integer which is equal to or greater than 8 and less than a predetermined integer (e.g., 24) and which may be a value indicating the subframe at (or right after) which the UE completes preparation for activating the SCell. The UE has to complete preparing activation of the SCell at least before subframe n+k. Since k is an integer equal to or greater than 0, the CSI report starts before the PDCCH report or at the same subframe as the PDCCH report.

The UE starts monitoring PDCCH of the SCell at the subframe n+x at operation 1325. Here, x is a value indicating the subframe at which the random access preamble is transmitted through the pSCell, the subframe at which a valid random access response message is received through the pSCell, or the 6th subframe since the subframe at which the valid random access response message is received through the pSCell.

The UE performs the random access procedure and, if the random access procedure succeeds, the procedure goes to operation 1330.

At operation 1330, the UE starts CSI report for the SCell at the subframe n+y. Here, y is a value indicating the first subframe at which the PUCCH is configured for CSI report for the SCell among the subframes since the time when the UE acquires the Master Information Block (MIB) (see TS36.331) of the pSCell.

Here, y is an integer greater than x. That is, the PDCCH monitoring starts before the start time of the CSI report.

Figure 14:
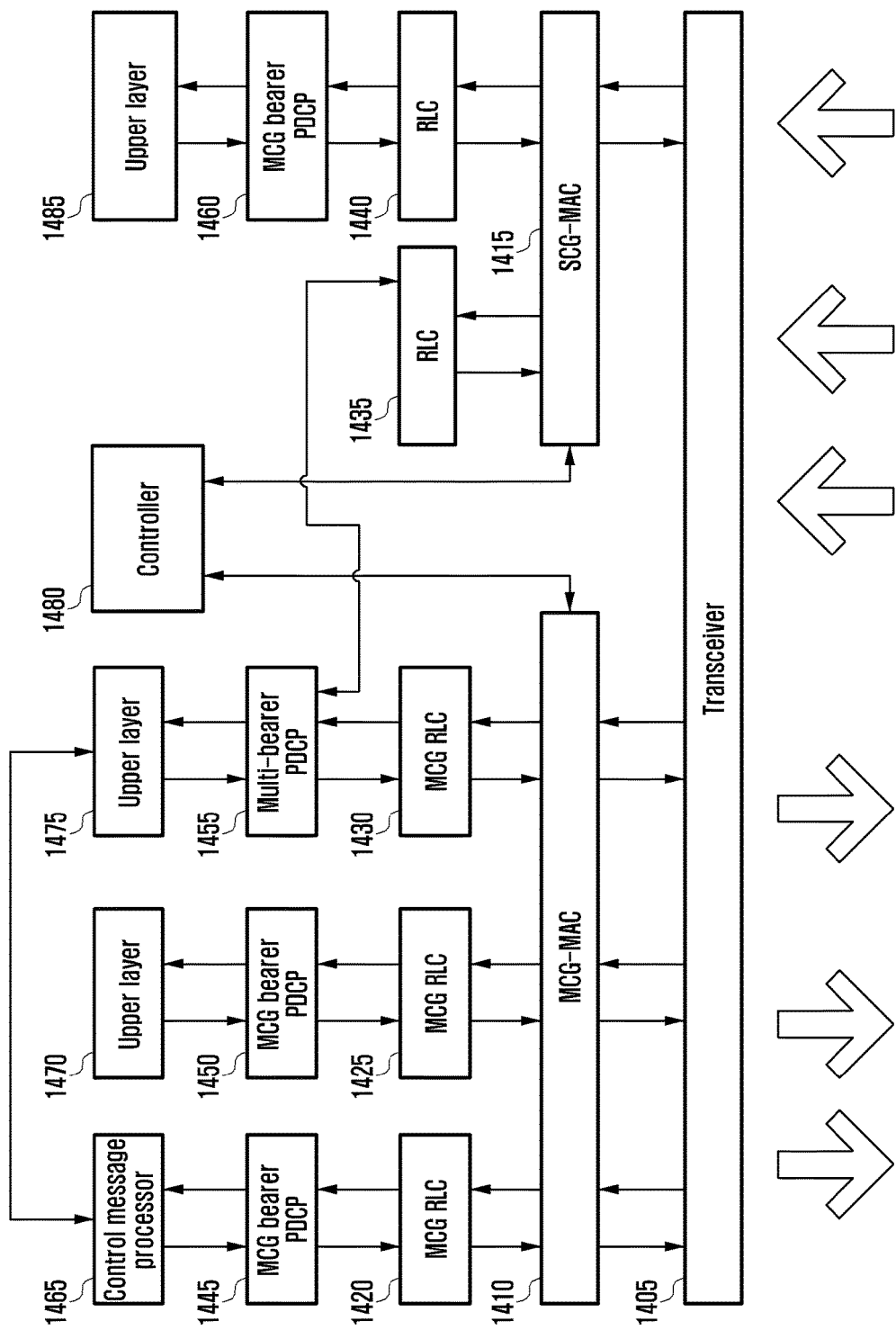
FIG. 14 is a block diagram illustrating a configuration of the UE operating in an LTE system according to an embodiment of the present disclosure.

FIG. 14 is a block diagram illustrating a configuration of the UE operating in an LTE system according to an embodiment of the present disclosure.

Referring to FIG. 14, the UE includes a control message processor 1465, upper layer processors 1470, 1475, and 1485, a controller 1480, an SCG-MAC entity 1415, a MCG-MAC entity 1410, a transceiver 1405, PDCP entities 1445, 1450, 1455, and 1460, and RLC entities 1420, 1425, 1430, 1435, and 1440.

The transceiver 1405 receives data and predetermined control signals through a downlink channel of a serving cell and transmits data and predetermined control signal through an uplink channel. In the case that a plurality of serving cells are configured, the transceiver 1405 transmits and receives data and control signals through the plurality serving cells.

The MCG-MAC entity 1410 multiplexes data generated by the RLC entities or demultiplexes the data received by the transceiver 1405 and delivers the demultiplexed data to appropriate RLC entities. The MCG-MAC entity processes the BSR or PHR triggered for the MCG.

The control message processor 1465 is an RRC layer entity which processes the control message received from the eNB and takes a necessary action. For example, it receives an RRC control message and sends various configuration informations to the controller 1480.

The upper layer processor is established per service. The upper layer processor processes the user service data such as FTP and VoIP data and transfers the processed data to the PDCP entity.

The controller 1480 checks the scheduling command, e.g., uplink grant, received by the transceiver 1405 and controls the transceiver 1405 and a multiplexer/demultiplexer to perform uplink transmission on appropriate resource at appropriate timing. The controller 1480 performs various control functions associated with the UE operations as described with reference to FIGS. 6 to 13. Although FIG. 14 is directed to the case where the UE is comprised of independent function blocks such as the MCG-MAC entity 1410, the control message processor 1465, various upper layer processors 1470, 1475, and 1485, the controller 1480, the SCG-MAC entity 1415, the MCG-MAC entity 1410, the transceiver 1405, the PDCP entities 1445, 1450, 1455, and 1460, and the RLC entities 1420, 1425, 1430, 1435, and 1440; at least two of the MCG-MAC entity 1410, the control message processor 1465, various upper layer processors 1470, 1475, and 1485, the controller 1480, the SCG-MAC entity 1415, the MCG-MAC entity 1410, the transceiver 1405, the PDCP entities 1445, 1450, 1455, and 1460, and the RLC entities 1420, 1425, 1430, 1435, and 1440 may be integrated into one unit.

Also, the UE can be implemented with a transceiver for communication with at least one network node and a controller for controlling overall operations of the UE. In this case, the controller controls to receive a control message indicating activation of at least one SCell, determine whether the SCell to be activated is the pSCell based on the control message, monitor, when the SCell to be activated is the pSCell, the PDCCH of the SCell, and report CSI through the SCell after starting the PDCCH monitoring.

The PDCCH monitoring start time may correspond to a subframe in which the UE starts transmitting a random access preamble through the pSCell, a subframe in which the UE receives a valid random access response message through the pSCell, or a subframe after a predetermined number of subframes since the subframe in which the valid random access response message is received through the pSCell. The predetermined time may be 6 subframes. The CSI report time may correspond to the first subframe for CSI report for the SCell after the time when the UE acquires the System Frame Number (SFN) of the pSCell.

If the SCell to be activated is not the pSCell, the controller controls to report the CSI for the SCell and then monitor PDCCH of the SCell.

Although the descriptions are made of the individual function blocks of the UE for explanation convenience, the present disclosure is not limited to the configuration as depicted in the drawing. Although the descriptions are made of the functions and operations of the individual blocks, the control unit may control the operations of the UE as described with reference to FIGS. 1 to 12 as well as the functions and operations described with reference to FIG. 13.

A description is made of the configuration of the eNB operating in the LTE system according to various embodiments of the present disclosure hereinafter with reference to FIG. 15.

Figure 15:
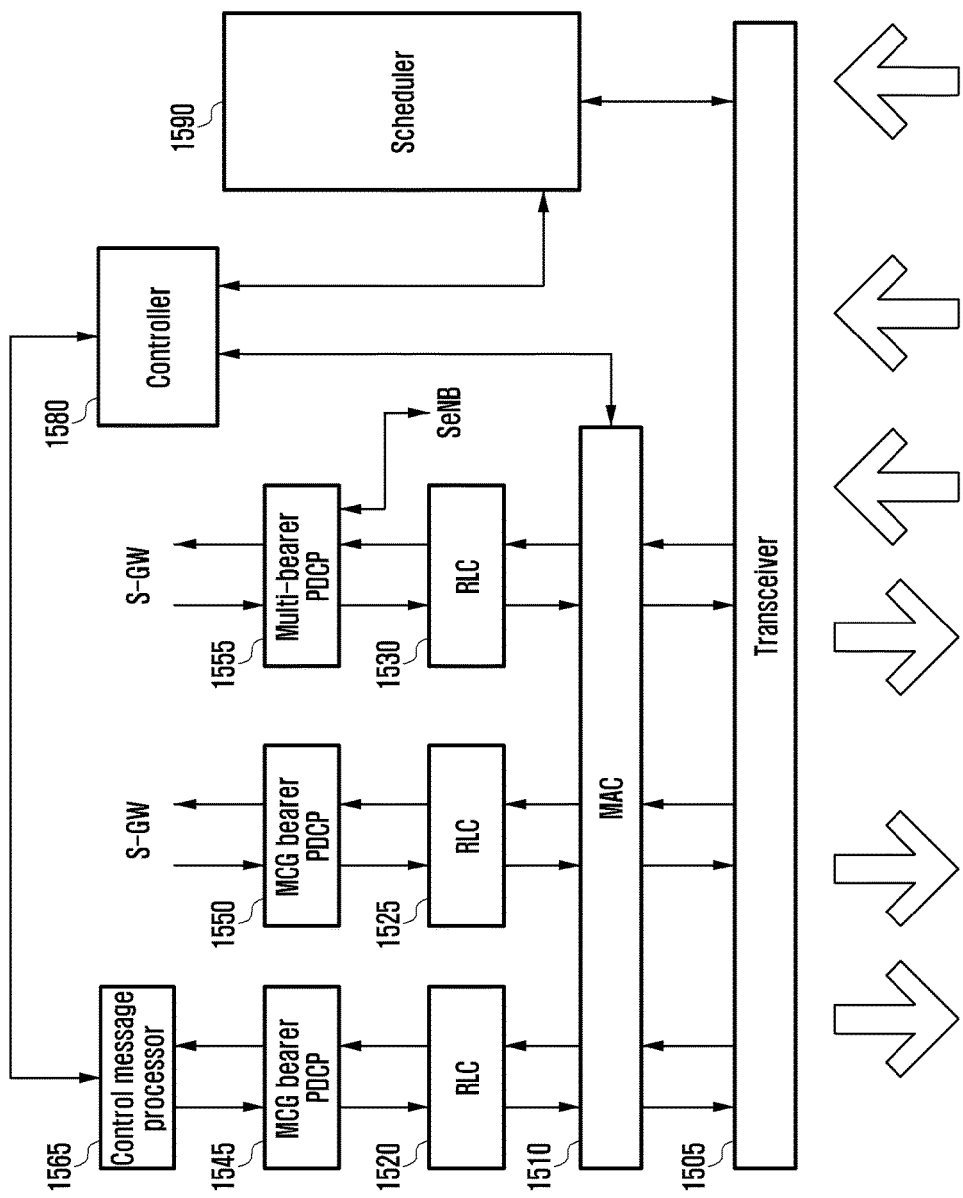
FIG. 15 is a block diagram illustrating a configuration of the eNB operating in the LTE system according to an embodiment of the present disclosure.

FIG. 15 is a block diagram illustrating a configuration of the eNB operating in the LTE system according to an embodiment of the present disclosure.

Referring to FIG. 15, the eNB includes a MAC entity 1510, a control message processor 1565, a controller 1580, a transceiver 1505, PDCP entities 1545, 1550, and 1555, RLC entities 1520, 1525, and 1530, and a scheduler 1590.

The transceiver 1505 transmits data and predetermined control signals through a downlink carrier and receives data and predetermined control signals through an uplink carrier. In the case of a plurality of carriers are configured, the transceiver 1505 transmits and receives the data and control signals through the plural carriers.

The MAC entity 1510 multiplexes data generated by the RLC entities 1520, 1525, and 1530 or demultiplexes the data from the transceiver and delivers the demultiplexed data to appropriate RLC entities and the controller 1580.

The scheduler 1590 allocates transmission resource to the UE at an appropriate timing in consideration of buffer status of the UE and channel condition and controls the transceiver to receive and transmit signals. The PDCP entities include the MCG bearer PDCP entities 1545 and 1550 and the multi-bearer PDCP entity 1555. The MCG bearer PDCP entity transmits/receives data through only the MCG and connects to one RLC entity. The controller 1580 controls the operations of the MeNB among the operations as described with reference to FIGS. 6 to 12.

Although FIG. 15 is directed to the case where the eNB is comprised of independent function blocks such as the MAC entity 1510, the control message processor 1565, the controller 1580, the transceiver 1505, the PDCP entities 1545, 1550, and 1555, RLC entities 1520, 1525, and 1530, and the scheduler 1590; at least two of the MAC entity 1510, the control message processor 1565, the controller 1580, the transceiver 1505, the PDCP entities 1545, 1550, and 1555, RLC entities 1520, 1525, and 1530, and the scheduler 1590 may be integrated into one unit.

Although the descriptions are made of the individual function blocks of the eNB for explanation convenience, the present disclosure is not limited to the configuration as depicted in the drawing. Although the descriptions are made of the functions and operations of the individual blocks, the control unit may control the operations of the eNB as described with reference to FIGS. 1 to 13 as well as the functions and operations described with reference to FIG. 15.

As described above, the SCell activation method and apparatus of the present disclosure is advantageous in terms of facilitating inter-eNB CA so as to improve transmission/reception data rate in a mobile communication system supporting DC.

Also, the SCell activation method and apparatus of the present disclosure is advantageous in terms of improving the transmission/reception data rate of the UE through inter-eNB CA in a mobile communication system supporting DC.

The above-described aspects of the present disclosure can be implemented in the form of computer-executable program commands stored in a computer-readable storage medium. The computer-readable storage medium is a data storage device capable of storing the data readable by a computer system. Examples of the computer-readable storage medium include Read-Only Memory (ROM), Random-Access Memory (RAM), Compact Disc (CD) ROM, magnetic tape, floppy disc, optical data storage devices, and carrier waves (such as data transmission through Internet). The computer-readable storage medium may be distributed to the computer systems connected through a network such that the computer-readable codes are stored and executed in a distributed manner. The functional programs, codes, and code segments for implementing the present disclosure can be interpreted by the programmers skilled in the art.

The apparatus and method according to an embodiment of the present disclosure can be implemented by hardware, software, or a combination thereof. Certain software can be stored in volatile or nonvolatile storage device such as ROM, memory such as RAM, memory chip, and integrated circuit, and storage media capable of recordable optically or magnetically or readable by machines (e.g., computer) such as CD, Digital Versatile Disc (DVD), magnetic disc, and magnetic tape. The method according to an embodiment of the present disclosure can be implemented by a computer or a mobile terminal including a controller and a memory, and the memory is a storage medium capable of storing and reading the program or programs including the instructions implementing the various embodiments of the present disclosure.

Thus the present disclosure includes the programs including the codes for implementing the apparatus and method specified in a claim of the present disclosure and a non-transitory machine-readable (computer-readable) storage media capable of storing the program and reading the program.

The apparatus according to an embodiment of the present disclosure may receive the program from a program providing device connected through a wired or wireless link and store the received program. The program providing device may include a program including instructions executing a pre-configured contents protection method, a memory for storing information necessary for the contents protection method, a communication unit for performing wired or wireless communication with a graphic processing device, and a controller for transmitting a request of the graphic processing device or the corresponding program automatically to the transceiver.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a user equipment (UE), the method comprising:
    receiving, from a first base station, a first message for requesting UE capability information; and
    transmitting, to the first base station, a second message including the UE capability information, the UE capability information including information on band combinations supported by the UE and information on each of at least one band combination among the band combinations including first information indicating that the UE supports a dual connectivity for each of the at least one band combination,
    wherein the at least one band combination is used to configure a cell associated with a second base station and a cell associated with the first base station for the UE, and
    wherein the first information includes second information indicating that the UE supports asynchronous dual connectivity.

2. The method of claim 1, wherein the first information indicates that the UE supports intra-band dual connectivity for a band combination comprising a single band entry.

3. The method of claim 1,
    wherein the first information indicates that the UE supports a dual connectivity for a band combination comprising of two or more band entries, and
    wherein the first information further indicates that serving cells corresponding to band entries belong to one cell group.

4. The method of claim 1,
    wherein the UE capability information includes bearer type information, and
    wherein the bearer type information includes at least one of information associated with a split bearer or information associated with a secondary cell group (SCG) bearer.

5. A user equipment (UE) comprising:
    a transceiver; and
    a controller configured to control the transceiver to:
        receive, from a first base station, a first message for requesting UE capability information, and
        transmit, to the first base station, a second message including the UE capability information message, the UE capability information including information on band combinations supported by the UE and information on each of at least one band combination among the band combinations including first information indicating that the UE supports a dual connectivity for each of the at least one band combination,
    wherein the at least one band combination is used to configure a cell associated with a second base station and a cell associated with the first base station for the UE, and
    wherein the first information includes second information indicating that the UE supports asynchronous dual connectivity.

6. The UE of claim 5, wherein the first information indicates that the UE supports intra-band dual connectivity for a band combination comprising a single band entry.

7. The UE of claim 5,
    wherein the first information indicates that the UE supports a dual connectivity for a band combination comprising two or more band entries, and
    wherein the first information further indicates that serving cells corresponding to the band entries belong to one cell group.

8. The UE of claim 5,
    wherein the UE capability information includes bearer type information, and
    wherein the bearer type information includes at least one of information associated with a split bearer or information associated with a secondary cell group (SCG) bearer.

9. A method of a base station, the method comprising:
    transmitting, to a user equipment (UE), a first message for requesting UE capability information; and
    receiving, from the UE, a second message including the UE capability information, the UE capability information including first information on band combinations supported by the UE and information on each of at least one band combination among the band combinations including first information indicating that the UE supports a dual connectivity for each of the at least one band combination,
    wherein the at least one band combination is used to configure a cell associated with a second base station and a cell associated with the first base station for the UE, and
    wherein the first information includes second information indicating that the UE supports asynchronous dual connectivity.

10. The method of claim 9, wherein the first information indicates that the UE supports intra-band dual connectivity for a band combination comprising a single band entry.

11. The method of claim 9,
    wherein the first information indicates that the UE supports a dual connectivity for a band combination comprising two or more band entries, and
    wherein the first information further indicates that serving cells corresponding to band entries belong to one cell group.

12. The method of claim 9,
    wherein the UE capability information includes bearer type information, and
    wherein the bearer type information includes at least one of information associated with a split bearer or information associated with a secondary cell group (SCG) bearer.

13. A base station comprising:
    a transceiver; and
    a controller configured to control the transceiver to:
        transmit, to a user equipment (UE), a first message for requesting UE capability information, and
        receive, from the UE, a second message including the UE capability information, the UE capability information including information on band combinations supported by the UE and information on each of at least one band combination among the band combinations including first information indicating that the UE supports a dual connectivity for each of the at least one band combination, wherein the at least one band combination is used to configure a cell associated with a second base station and a cell associated with the first base station for the UE, and wherein the first information includes second information indicating that the UE supports asynchronous dual connectivity.

14. The base station of claim 13, wherein the first information indicates that the UE supports intra-band dual connectivity for a band combination comprising a single band entry.

15. The base station of claim 13,
wherein the first information indicates that the UE supports a dual connectivity for a band combination comprising of two or more band entries, and
wherein the first information further indicates that serving cells corresponding to band entries belong to one cell group.

16. The base station of claim 13,
wherein the UE capability information includes bearer type information, and
wherein the bearer type information includes at least one of information associated with a split bearer or information associated with a secondary cell group (SCG) bearer.

* * * * *